United States Patent
Lin et al.

(10) Patent No.: US 11,533,769 B2
(45) Date of Patent: Dec. 20, 2022

(54) MULTI-HOP DATA TRANSMISSION METHOD AND APPARATUS

(71) Applicant: Huawei Technologies Co., Ltd., Shenzhen (CN)

(72) Inventors: Gang Lin, Shanghai (CN); Changhui Wen, Shanghai (CN); Xudong Wang, Shanghai (CN); Cheng Huang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/187,404

(22) Filed: Feb. 26, 2021

(65) Prior Publication Data

US 2021/0185750 A1    Jun. 17, 2021

Related U.S. Application Data

(63) Continuation of application No. PCT/CN2019/101839, filed on Aug. 21, 2019.

(30) Foreign Application Priority Data

Aug. 31, 2018  (CN) .......................... 201811014628.1

(51) Int. Cl.
*H04W 76/15*  (2018.01)
*H04L 41/0803*  (2022.01)
(Continued)

(52) U.S. Cl.
CPC ......... *H04W 76/15* (2018.02); *H04L 41/0803* (2013.01); *H04L 43/028* (2013.01); *H04W 28/0252* (2013.01); *H04W 40/02* (2013.01)

(58) Field of Classification Search
None
See application file for complete search history.

(56) References Cited

U.S. PATENT DOCUMENTS

2017/0019833 A1*  1/2017  Luo ........................ H04W 40/02
2021/0235332 A1*  7/2021  Schmidt ............ H04W 36/0061

FOREIGN PATENT DOCUMENTS

| CN | 101267240 A | 9/2008 |
|----|-------------|--------|
| CN | 101325794 A | 12/2008 |

(Continued)

OTHER PUBLICATIONS

"Mapping between PDU sessions and DRBs, and Routing of Flows between DRBs and Upper layers," 3GPP TSG-RAN WG2 Meeting #96, Reno, USA, R2-168773, Total 4 pages, 3rd Generation Partnership Project, Valbonne, France (Nov. 14-18, 2016).

(Continued)

*Primary Examiner* — Anh Vu H Ly
(74) *Attorney, Agent, or Firm* — Leydig, Voit & Mayer, Ltd.

(57) ABSTRACT

This application provides a multi-hop data transmission method and apparatus, where the method includes: A primary base station obtains route configuration information, where the route configuration information indicates a first data transmission path between a terminal device and a serving gateway, the first data transmission path includes at least two route base stations, and the at least two route base stations include a secondary base station for the terminal device; and the primary base station sends the route configuration information to the at least two route base stations.

16 Claims, 18 Drawing Sheets

(51) Int. Cl.
    *H04L 43/028*      (2022.01)
    *H04W 28/02*      (2009.01)
    *H04W 40/02*      (2009.01)

(56) References Cited

FOREIGN PATENT DOCUMENTS

| | | | | |
|---|---|---|---|---|
| CN | 101835202 A | 9/2010 | | |
| EP | 3745776 A1 | * 12/2020 | ............. | H04L 45/22 |
| WO | WO-2019243137 A1 | * 12/2019 | ........... | H04L 45/125 |

OTHER PUBLICATIONS

"3rd Generation Partnership Project; Technical Specification Group Radio Access Network; Evolved Universal Terrestrial Radio Access (E-UTRA); Physical layer procedures (Release 15)," 3GPP TS 36.213 V15.2.0, pp. 1-539, 3rd Generation Partnership Project, Valbonne, France (Jun. 2018).

"3rd Generation Partnership Project; Technical Specification Group Services and System Aspects; Policy and charging control architecture (Release 15)," 3GPP TS 23.203 V15.3.0, pp. 1-262, 3rd Generation Partnership Project, Valbonne, France (Jun. 2018).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 3GPP TS 36.300 V15.2.0, pp. 1-357, 3rd Generation Partnership Project, Valbonne, France (Jun. 2018).

"3rd Generation Partnership Project; Technical Specification Group Services and System Aspects; General Packet Radio Service (GPRS) enhancements for Evolved Universal Terrestrial Radio Access Network (E-UTRAN) access Release 15)," 3GPP TS 23.401 V15.4.0, pp. 1-410, 3rd Generation Partnership Project, Valbonne, France (Jun. 2018).

Polese et al., "End-to-End Simulation of Integrated Access and Backhaul at mmWaves," 2018 IEEE International Workshop on Computer-Aided Analysis and Design of Communication Links and Networks (CAMAD), Sep. 2018, Barcelona, Spain, XP080900843, Total 8 pages, Institute of Electrical and Electronics Engineers, New York, New York (Aug. 1, 2018).

"3rd Generation Partnership Project; Technical Specification Group Radio Access Network; Study on Integrated Access and Backhaul; (Release 15)," 3GPP TR 38.874 V0.4.0, pp. 1-55, 3rd Generation Partnership Project, Valbonne, France (Aug. 2018).

* cited by examiner

MULTI-HOP DATA TRANSMISSION METHOD AND APPARATUS

CROSS-REFERENCE TO RELATED APPLICATIONS

This application is a continuation of International Application No. PCT/CN2019/101839, filed on Aug. 21, 2019, which claims priority to Chinese Patent Application No. 201811014628.1, filed on Aug. 31, 2018. The disclosures of the aforementioned applications are hereby incorporated by reference in their entireties.

TECHNICAL FIELD

Embodiments of this application relate to the field of communications technologies, and in particular, to a multi-hop data transmission method and apparatus.

BACKGROUND

Currently, an access network part of a mobile communications system supports only a one-hop (a base station-a terminal device) communication mode and a two-hop (a base station-a relay device-a terminal device) communication mode. In the one-hop communication mode or the two-hop communication mode, there is a maximum of one relay device between a terminal device and a base station. Therefore, no complex routing mechanism is required for data transmission between the terminal device and the base station.

With requirements for ultra-high rates and massive connections in communications systems, the 3rd generation partnership project (3GPP) proposes an ultra dense networking (UDN) technology in a future mobile communications system. In the ultra dense network technology, a distance between a macro base station and a micro base station (which may also be referred to as a small cell, and is referred to as a small cell below) or between small cells is reduced (where an inter-site distance may reach 50 to 100 meters), a spatial multiplexing rate is improved, and a data transmission rate and a quantity of connections between terminal devices and base stations correspondingly increase. However, in the ultra dense network technology, due to limitations of costs and geographical conditions, a fiber cannot be deployed in each small cell, and consequently, wired backhaul cannot be implemented. For example, some small cells are deployed at simple positions such as street lamps. Therefore, data of terminal devices accessing these small cells cannot be sent to a core network through a wired network. Instead, the data needs to be sent to a base station or a small cell with fiber backhaul based on wireless backhaul between small cells, and then the data is sent by the base station or the small cell with the fiber backhaul to the core network. In this case, data transmission between a terminal device and a base station or a small cell with fiber backhaul is based on a plurality of small cells, that is, an access network part needs to support a multi-hop path communication mode.

However, a current mobile communications standard does not specify how to implement multi-hop data transmission when a topology structure of an access network is complex. Therefore, how to implement multi-hop data transmission in an ultra dense network has no clear solution, and is an urgent problem to be resolved.

SUMMARY

Embodiments of this application provide a multi-hop data transmission method and apparatus, to resolve a problem of how to implement multi-hop data transmission in an ultra dense network.

According to a first aspect, an embodiment of this application provides a multi-hop data transmission method. The method includes:

A primary base station obtains route configuration information, where the route configuration information is used to indicate a first data transmission path between a terminal device and a serving gateway, the first data transmission path includes at least two route base stations, and the at least two route base stations include a secondary base station for the terminal device; and the primary base station sends the route configuration information to the at least two route base stations.

According to the foregoing method, the primary base station sends the obtained route configuration information to the route base station in the first data transmission path, so that each route base station can determine the data transmission path between the terminal device and the serving gateway, thereby resolving a problem of implementing multi-hop data transmission between the terminal device and the serving gateway.

In a possible design, that a primary base station obtains route configuration information includes: The primary base station receives the route configuration information from a network management system.

According to the foregoing method, the primary base station receives the route configuration information from the network management system, so that consumption of resources of the primary base station can be avoided, and load of the primary base station can be reduced.

In a possible design, before the primary base station receives the route configuration information from the network management system, the method further includes:

The primary base station receives a route establishment request message from the terminal device or a data gateway, where the route establishment request message is used to request to establish the route configuration information; and the primary base station sends the route establishment request message to the network management system.

In a possible design, that the primary base station sends the route configuration information to the at least two route base stations includes: The primary base station sequentially sends the route configuration information to the at least two route base stations in a direction opposite to a direction in which data passes through the at least two route base stations in the first data transmission path.

According to the foregoing method, when the uplink data of the terminal device is sent to one of the at least two route base stations, a case in which the uplink data of the terminal device is discarded because the route base station does not receive the route configuration information can be avoided.

In a possible design, the method further includes: The primary base station receives a route change request message from the secondary base station, where the route change request message is used to request to update the route configuration information; and the primary base station obtains updated route configuration information.

According to the foregoing method, the primary base station may update, in real time, the data transmission path between the terminal device and the serving gateway based on the request of the secondary base station, thereby meeting a Quality of Service (QoS) requirement of data transmission.

In a possible design, the method further includes: The primary base station sends a topology change message to the network management system, where the topology change message is used to indicate that a topology of the first data transmission path changes; and the primary base station obtains the updated route configuration information.

According to the foregoing method, the primary base station may update, in real time, the data transmission path between the terminal device and the serving gateway when the topology of the first data transmission path changes, thereby meeting the QoS requirement of the data transmission.

In a possible design, the updated route configuration information is used to indicate a second data transmission path between the terminal device and the serving gateway, and the second data transmission path includes at least two route base stations; and the method further includes: If determining that the secondary base station for the terminal device changes to a first base station, the primary base station indicates the terminal device to establish a data radio bearer (DRB) with the first base station, where the first base station is a route base station in the second data transmission path.

In a possible design, the updated route configuration information is used to indicate a second data transmission path between the terminal device and the serving gateway, and the second data transmission path includes at least two route base stations; and the method further includes: If determining that an edge base station changes to a second base station, the primary base station indicates the second base station to establish an S1 bearer with the serving gateway, where the second base station is a route base station in the second data transmission path, and the edge base station is a route base station that establishes the S1 bearer with the serving gateway and that is in the at least two route base stations included in the first data transmission path.

According to a second aspect, an embodiment of this application provides a multi-hop data transmission apparatus. The multi-hop data transmission apparatus includes a processor, and the processor is coupled to a memory. The memory is configured to store an instruction, and the processor is configured to execute the instruction stored in the memory, to perform the method according to any one of the first aspect or the possible designs of the first aspect. Optionally, the multi-hop data transmission apparatus may further include the memory. Optionally, the multi-hop data transmission apparatus may further include a transceiver, configured to support the multi-hop data transmission apparatus in sending and/or receiving the information in the foregoing method. Optionally, the multi-hop data transmission apparatus may be a base station, or may be an apparatus, for example, a chip or a chip system, in a base station. The chip system includes at least one chip, and the chip system may further include another circuit structure and/or discrete component.

According to a third aspect, an embodiment of this application provides a multi-hop data transmission apparatus. The apparatus is configured to implement the method according to any one of the first aspect or the possible designs of the first aspect. The apparatus includes corresponding function modules, for example, a receiving unit and a sending unit, separately configured to implement the steps in the foregoing method.

According to a fourth aspect, an embodiment of this application provides a multi-hop data transmission method. The method includes:

When determining that a data radio bearer DRB corresponding to to-be-sent data is not established and a delay of the to-be-sent data is greater than a threshold, a terminal device determines a route establishment request message, where the route establishment request message is used to request to establish route configuration information; and the terminal device sends the route establishment request message to a primary base station.

According to the foregoing method, when determining that the DRB corresponding to the to-be-sent data is not established, the terminal device may request to establish the route configuration information through the primary base station, so that a data transmission path between the terminal device and a serving gateway can be established when the DRB is established.

In a possible design, after the terminal device sends the route establishment request message to the primary base station, the method further includes: The terminal device receives a Traffic Flow Template (TFT) configuration request message from a data gateway, where the TFT configuration request message is used to request the terminal device to: establish a data radio bearer DRB, and configure a TFT corresponding to the DRB; the terminal device establishes the DRB between the terminal device and a secondary base station based on the TFT configuration request message; and if determining that there is a first TFT corresponding to the DRB, and a quality of service class identifier QCI corresponding to the first TFT is the same as a QCI of the data transmitted on the DRB, the terminal device adds a data packet filter matching the to-be-sent data to the first TFT; or if determining that there is a first TFT corresponding to the DRB, and a QCI corresponding to the first TFT is different from a QCI of the data transmitted on the DRB, the terminal device newly establishes a second TFT, and adds a data packet filter matching the to-be-sent data to the second TFT; or if determining that there is no first TFT corresponding to the DRB, the terminal device newly establishes a second TFT, and adds a data packet filter matching the to-be-sent data to the second TFT.

In a possible design, the terminal device communicates with the primary base station through a low frequency link; and the terminal device communicates with the secondary base station through a high frequency link.

In a possible design, that the terminal device determines that the DRB corresponding to the to-be-sent data is not established includes: When a TFT for the terminal device does not include the data packet filter matching the to-be-sent data, the terminal device determines that the DRB is not established.

According to a fifth aspect, an embodiment of this application provides a multi-hop data transmission apparatus. The multi-hop data transmission apparatus includes a processor, and the processor is coupled to a memory. The memory is configured to store an instruction, and the processor is configured to execute the instruction stored in the memory, to perform the method according to any one of the fourth aspect or the possible designs of the fourth aspect. Optionally, the multi-hop data transmission apparatus may further include the memory. Optionally, the multi-hop data transmission apparatus may further include a transceiver, configured to support the multi-hop data transmission apparatus in sending and/or receiving the information in the foregoing method. Optionally, the multi-hop data transmission apparatus may be a terminal device, or may be an apparatus, for example, a chip or a chip system, in a terminal device. The chip system includes at least one chip, and the chip system may further include another circuit structure and/or discrete component.

According to a sixth aspect, an embodiment of this application provides a multi-hop data transmission apparatus. The apparatus is configured to implement the method according to any one of the fourth aspect or the possible designs of the fourth aspect. The apparatus includes corresponding function modules, for example, a processing unit and a transceiver unit, separately configured to implement the steps in the foregoing method.

According to a seventh aspect, an embodiment of this application provides a multi-hop data transmission method. The method includes: A network management system determines route configuration information, where the route configuration information is used to indicate a first data transmission path between a terminal device and a serving gateway, the first data transmission path includes at least two route base stations, and the at least two route base stations include a secondary base station for the terminal device; and the network management system sends the route configuration information to a primary base station.

According to the foregoing method, each route base station in the first data transmission path can determine a data transmission path between the terminal device and the serving gateway by using the route configuration information determined by the network management system, thereby resolving a problem of implementing multi-hop data transmission between the terminal device and the serving gateway.

In a possible design, before the network management system determines the route configuration information, the method further includes: The network management system receives a route establishment request message sent by the primary base station, where the route establishment request message is used to request to establish the route configuration information.

In a possible design, the route configuration information includes at least one routing entry; and each of the at least one routing entry includes the following information: a source address, a destination address, an address of a next-hop route base station, a quality of service class identifier QCI corresponding to data of the terminal device, and a time to live TTL of the routing entry.

According to an eighth aspect, an embodiment of this application provides a multi-hop data transmission apparatus. The multi-hop data transmission apparatus includes a processor, and the processor is coupled to a memory. The memory is configured to store an instruction, and the processor is configured to execute the instruction stored in the memory, to perform the method according to any one of the seventh aspect or the possible designs of the seventh aspect. Optionally, the multi-hop data transmission apparatus may further include the memory. Optionally, the multi-hop data transmission apparatus may further include a transceiver, configured to support the multi-hop data transmission apparatus in sending and/or receiving the information in the foregoing method. Optionally, the multi-hop data transmission apparatus may be a network management system, or may be an apparatus, for example, a chip or a chip system, in a network management system. The chip system includes at least one chip, and the chip system may further include another circuit structure and/or discrete component.

According to a ninth aspect, an embodiment of this application provides a multi-hop data transmission apparatus. The apparatus is configured to implement the method according to any one of the seventh aspect or the possible designs of the seventh aspect. The apparatus includes corresponding function modules, for example, a processing unit and a transceiver unit, separately configured to implement the steps in the foregoing method.

According to a tenth aspect, an embodiment of this application provides a multi-hop data transmission method. The method includes: A secondary base station obtains route configuration information, where the route configuration information is used to indicate a first data transmission path between a terminal device and a serving gateway, the first data transmission path includes at least two route base stations, and the at least two route base stations include the secondary base station; the secondary base station establishes a data radio bearer DRB between the secondary base station and the terminal device, and establishes a first relationship, where the first relationship is a mapping relationship between a network address of an edge base station and a DRB identifier of the DRB, and the edge base station is a route base station that establishes an S1 bearer with the serving gateway and that is in the at least two route base stations; and the secondary base station transmits data for the terminal device based on the route configuration information and the first relationship or based on the DRB identifier.

According to the foregoing method, because the first data transmission path indicated by the route configuration information includes the at least two route base stations, the secondary base station may perform multi-hop data transmission for the terminal device based on the route configuration information.

In a possible design, the method further includes:

The secondary base station receives an uplink data packet from the terminal device, where the uplink data packet includes the DRB identifier.

That the secondary base station transmits data for the terminal device based on the route configuration information and the first relationship includes:

The secondary base station determines, in the first relationship, the network address of the edge base station based on the DRB identifier, and adds a network address header to the uplink data packet, where a destination address of the network address header is the network address of the edge base station; and the secondary base station sends the uplink data packet to which the network address header is added to a next-hop route base station indicated by the route configuration information.

In a possible design, the method further includes:

The secondary base station receives a downlink data packet of the terminal device, where the downlink data packet includes the DRB identifier.

That the secondary base station transmits data for the terminal device based on the DRB identifier includes:

The secondary base station sends the downlink data packet to the terminal device on the DRB corresponding to the DRB identifier.

In a possible design, the method further includes:

The secondary base station receives channel quality information from the terminal device, where the channel quality information indicates a channel quality value between the secondary base station and the terminal device; and when the channel quality value indicated by the channel quality information is less than a preset channel quality value, the secondary base station sends a route change request message to a primary base station, where the route change request message is used to request to update the route configuration information.

According to an eleventh aspect, an embodiment of this application provides a multi-hop data transmission apparatus. The multi-hop data transmission apparatus includes a processor, and the processor is coupled to a memory. The memory is configured to store an instruction, and the processor is configured to execute the instruction stored in the memory, to perform the method according to any one of the tenth aspect or the possible designs of the tenth aspect. Optionally, the multi-hop data transmission apparatus may further include the memory. Optionally, the multi-hop data transmission apparatus may further include a transceiver, configured to support the multi-hop data transmission apparatus in sending and/or receiving the information in the foregoing method. Optionally, the multi-hop data transmission apparatus may be a base station, or may be an apparatus, for example, a chip or a chip system, in a base station. The chip system includes at least one chip, and the chip system may further include another circuit structure and/or discrete component.

According to a twelfth aspect, an embodiment of this application provides a multi-hop data transmission apparatus. The apparatus is configured to implement the method according to any one of the tenth aspect or the possible designs of the tenth aspect. The apparatus includes corresponding function modules, for example, a processing unit and a transceiver unit, separately configured to implement the steps in the foregoing method.

According to a thirteenth aspect, an embodiment of this application provides a multi-hop data transmission method. The method includes:

An edge base station receives route configuration information from a primary base station, where the route configuration information is used to indicate a first data transmission path between a terminal device and a serving gateway, the first data transmission path includes at least two route base stations, the at least two route base stations include a secondary base station for the terminal device, and the edge base station is a device that establishes an S1 bearer with the serving gateway and that is in the at least two route base stations; the edge base station receives a data radio bearer DRB identifier from the secondary base station, where the DRB identifier is an identifier of a data radio bearer DRB between the secondary base station and the terminal device; the edge base station establishes the S1 bearer with the serving gateway, and establishes a second relationship, where the second relationship is a mapping relationship between the DRB identifier and an S1 tunnel endpoint identifier (TEID) of the S1 bearer; and the edge base station transmits data for the terminal device based on the DRB identifier and the second relationship or based on the S1 TEID, the second relationship, and the route configuration information.

According to the foregoing method, because the first data transmission path indicated by the route configuration information includes the at least two route base stations, the edge base station may perform multi-hop data transmission for the terminal device based on the route configuration information.

In a possible design, the method further includes:

The edge base station receives an uplink data packet of the terminal device, where the uplink data packet includes the DRB identifier.

That the edge base station transmits data for the terminal device based on the DRB identifier and the second relationship includes:

The edge base station determines, in the second relationship, the S1 TEID based on the DRB identifier, and replaces the DRB identifier in the uplink data packet with the S1 TEID;

the edge base station adds a network address header to the uplink data packet, where a destination address of the network address header is a network address of the serving gateway; and the edge base station sends the uplink data packet to which the network address header is added to the serving gateway on the S1 bearer corresponding to the S1 TEID.

In a possible design, the method further includes:

The edge base station receives a downlink data packet of the terminal device, where the downlink data packet includes the S1 TEID.

That the edge base station transmits data for the terminal device based on the S1 TEID, the second relationship, and the route configuration information includes:

The edge base station determines, in the second relationship, the DRB identifier based on the S1 TEID, and replaces the S1 TEID in the downlink data packet with the DRB identifier;

the edge base station adds a network address header to the downlink data packet, where a destination address of the network address header is a network address of the secondary base station; and the edge base station sends the downlink data packet to which the network address header is added to a next-hop route base station indicated by the route configuration information.

According to a fourteenth aspect, an embodiment of this application provides a multi-hop data transmission apparatus. The multi-hop data transmission apparatus includes a processor, and the processor is coupled to a memory. The memory is configured to store an instruction, and the processor is configured to execute the instruction stored in the memory, to perform the method according to any one of the thirteenth aspect or the possible designs of the thirteenth aspect. Optionally, the multi-hop data transmission apparatus may further include the memory. Optionally, the multi-hop data transmission apparatus may further include a transceiver, configured to support the multi-hop data transmission apparatus in sending and/or receiving the information in the foregoing method. Optionally, the multi-hop data transmission apparatus may be a base station, or may be an apparatus, for example, a chip or a chip system, in a base station. The chip system includes at least one chip, and the chip system may further include another circuit structure and/or discrete component.

According to a fifteenth aspect, an embodiment of this application provides a multi-hop data transmission apparatus. The apparatus is configured to implement the method according to any one of the thirteenth aspect or the possible designs of the thirteenth aspect. The apparatus includes corresponding function modules, for example, a processing unit and a transceiver unit, separately configured to implement the steps in the foregoing method.

According to a sixteenth aspect, an embodiment of this application provides a computer-readable storage medium. The computer-readable storage medium stores a computer-readable instruction; and when a computer reads and executes the computer-readable instruction, the computer performs the method according to any one of the foregoing aspects or the possible designs of the foregoing aspects.

According to a seventeenth aspect, an embodiment of this application provides a computer program product. When a computer reads and executes the computer program product, the computer performs the method according to any one of the foregoing aspects or the possible designs of the foregoing aspects.

According to an eighteenth aspect, an embodiment of this application provides a chip. The chip is connected to a memory, and is configured to read and execute a software program stored in the memory, to implement the method according to any one of the foregoing aspects or the possible designs of the foregoing aspects.

According to a nineteenth aspect, an embodiment of this application provides a multi-hop data transmission apparatus. The apparatus includes a processor, and the processor is coupled to a memory and is configured to read and execute an instruction in the memory, to implement the method according to any one of the foregoing aspects or the possible designs of the foregoing aspects.

According to a twentieth aspect, an embodiment of this application provides a communications system. The system includes the multi-hop data transmission apparatuses according to the second aspect, the fifth aspect, the eighth aspect, the eleventh aspect, and the fourteenth aspect.

DETAILED DESCRIPTION OF EMBODIMENTS

The following describes in detail embodiments of this application with reference to the accompanying drawings of this specification.

The embodiments of this application may be applied to various mobile communications systems, for example, a new radio (NR) system, a long term evolution (LTE) system, an advanced long term-evolution (LTE-A) system, an evolved long term evolution (eLTE) system, and another communications system such as a future communications system. This is not specifically limited herein.

Figure 1:
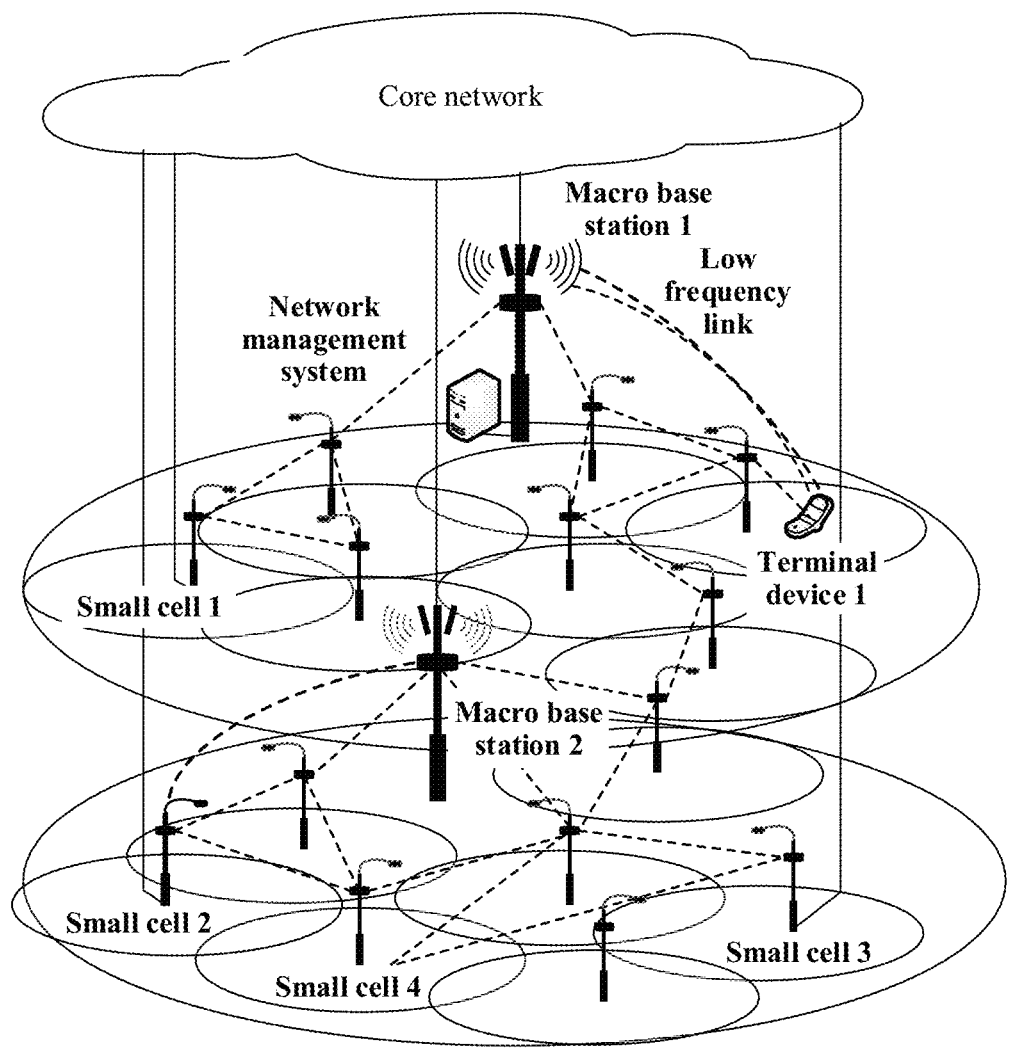
FIG. 1 is a schematic diagram of a communications system to which a communication method according to an embodiment of this application is applicable.

For ease of understanding the embodiments of this application, a communications system shown in FIG. 1 is first used as an example to describe in detail a communications system applicable to the embodiments of this application. The communications system shown in FIG. 1 uses an ultra dense network technology, and includes a plurality of small cells (for example, small cells 1, 2, and 3 in FIG. 1) with fiber backhaul and a plurality of small cells (for example, a small cell 4 in FIG. 1) without fiber backhaul. In FIG. 1, the communications system further includes network elements such as a network management system, a plurality of macro base stations (only a macro base station 1 and a macro base station 2 are used as examples in FIG. 1), and a terminal device (only one terminal device 1 is used as an example in FIG. 1). There is a fiber connection between the network management system and the macro base station. Low frequency links are used for communication between the macro base station and the terminal device, and between the macro base station and the small cell. High frequency links are used for communication between the terminal device and the small cell, and between the terminal device and the macro base station. The small cell with the fiber backhaul and the small cell without the fiber backhaul may be collectively referred to as small cells or home base stations.

In this embodiment of this application, the terminal device supports a dual connectivity technology. To be specific, the terminal device communicates with the small cell through a high frequency link, and communicates with the macro base station through a low frequency link.

Further, according to a 3GPP standard, communication between a terminal device and a packet data network gateway (P-GW) in a core network is implemented on an evolved packet system (EPS) bearer, to meet a quality of service (QoS) requirement of end-to-end data transmission. The EPS bearer includes a data radio bearer (DRB) between the terminal device and a macro base station or a small cell, an S1 bearer between the macro base station or the small cell and a serving gateway (S-GW), and an S5 bearer between the S-GW and the P-GW.

In a process of establishing the EPS bearer, a correspondence between the DRB bearer and the S1 bearer is stored in the macro base station or the small cell, and a correspondence between the S1 bearer and the S5 bearer is stored in the S-GW. The P-GW and each terminal device store traffic flow templates (TFTs) corresponding to bearers, to implement mapping between an IP data packet and a bearer. One TFT includes a plurality of data packet filters arranged in a specific sequence. The TFT is configured by the core network in a bearer establishment process, and the arrangement sequence of the data packet filters is specified by the core network. This is not limited in this embodiment of this application.

In the communications system shown in FIG. 1, data between the terminal device and a core network may need to be forwarded by a plurality of small cells in a transmission process. To be specific, the data needs to be forwarded in a multi-hop data transmission manner. Because an access network part of a current mobile communications system supports only one-hop or two-hop path transmission, data cannot be forwarded in the multi-hop data transmission. Therefore, the embodiments of this application provide a multi-hop data transmission method, to help implement multi-hop data transmission between a terminal device and a core network. Details are described below. It should be noted that, in the embodiments of this application, the multi-hop data transmission means that data is transmitted through two or more route base stations, and arrives at a terminal device or a serving gateway.

In the embodiments of this application, the terminal device is a device having a wireless transceiver function or a chip that can be disposed in the device. The device having the wireless transceiver function may also be referred to as a terminal device (user equipment, UE), an access terminal, a terminal device unit, a terminal device station, a mobile station, a remote station, a remote terminal, a mobile device, a terminal device agent, or a terminal device apparatus. During actual application, the terminal device in the embodiments of this application may be a mobile phone, a tablet computer (Pad), a computer with a wireless transceiver function, a virtual reality (VR) terminal, an augmented reality (AR) terminal, a wireless terminal in industrial control, a wireless terminal in self-driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in the embodiments of this application. In this application, the foregoing device having the wireless transceiver function and the chip that can be disposed in the device are collectively referred to as terminal devices.

In the embodiments of this application, a primary base station may be an access network device in various standards, and the primary base station may be a macro base station, for example, an evolved NodeB (eNB), a radio network management system (radio network controller, RNC), a NodeB (NB), a base station network management system (base station controller, BSC), a base transceiver station (BTS), a baseband unit (BBU), an access point (AP) in a wireless fidelity (Wi-Fi) system, a wireless relay node, a wireless backhaul node, or a transmission point (transmission and reception point (TRP) or transmission point (TP)). The primary base station may alternatively be a gNB or the like in a 5G system.

In the embodiments of this application, a route base station may be a radio access device in various standards, and the route base station may be a macro base station or a small cell. The route base station may be located in signal coverage of the primary base station, for example, the route base station may be a home base station (for example, a home evolved NodeB or a home NodeB (HNB)).

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that: With evolution of the network architecture and emergence of new service scenarios, the technical solutions provided in the embodiments of this application are also applicable to similar technical problems.

The following uses an example in which a terminal device initiates uplink route establishment for description.

Figure 2A:
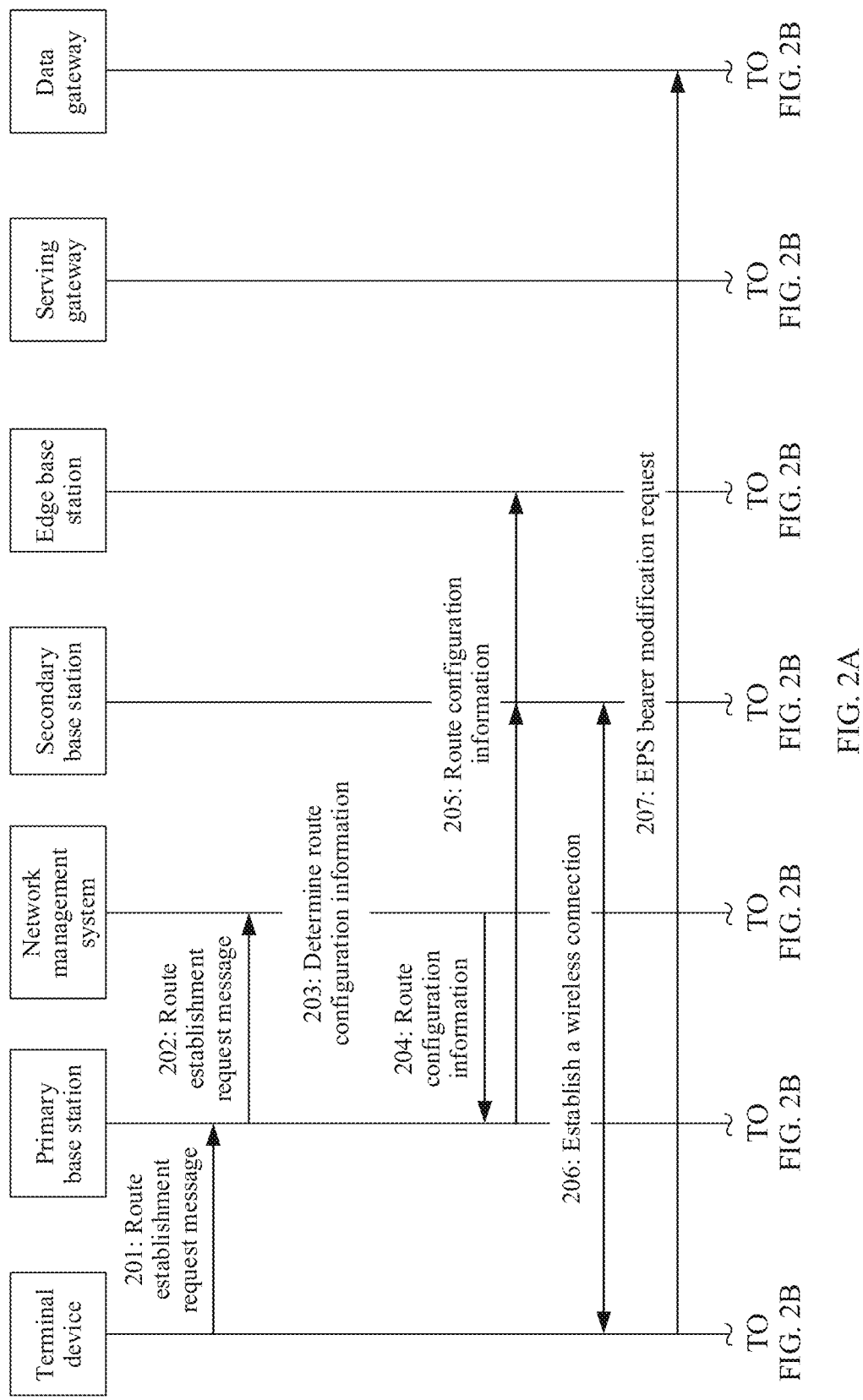
FIG. 2A and FIG. 2B are a schematic flowchart of a multi-hop data transmission method according to an embodiment of this application.
Figure 2B:
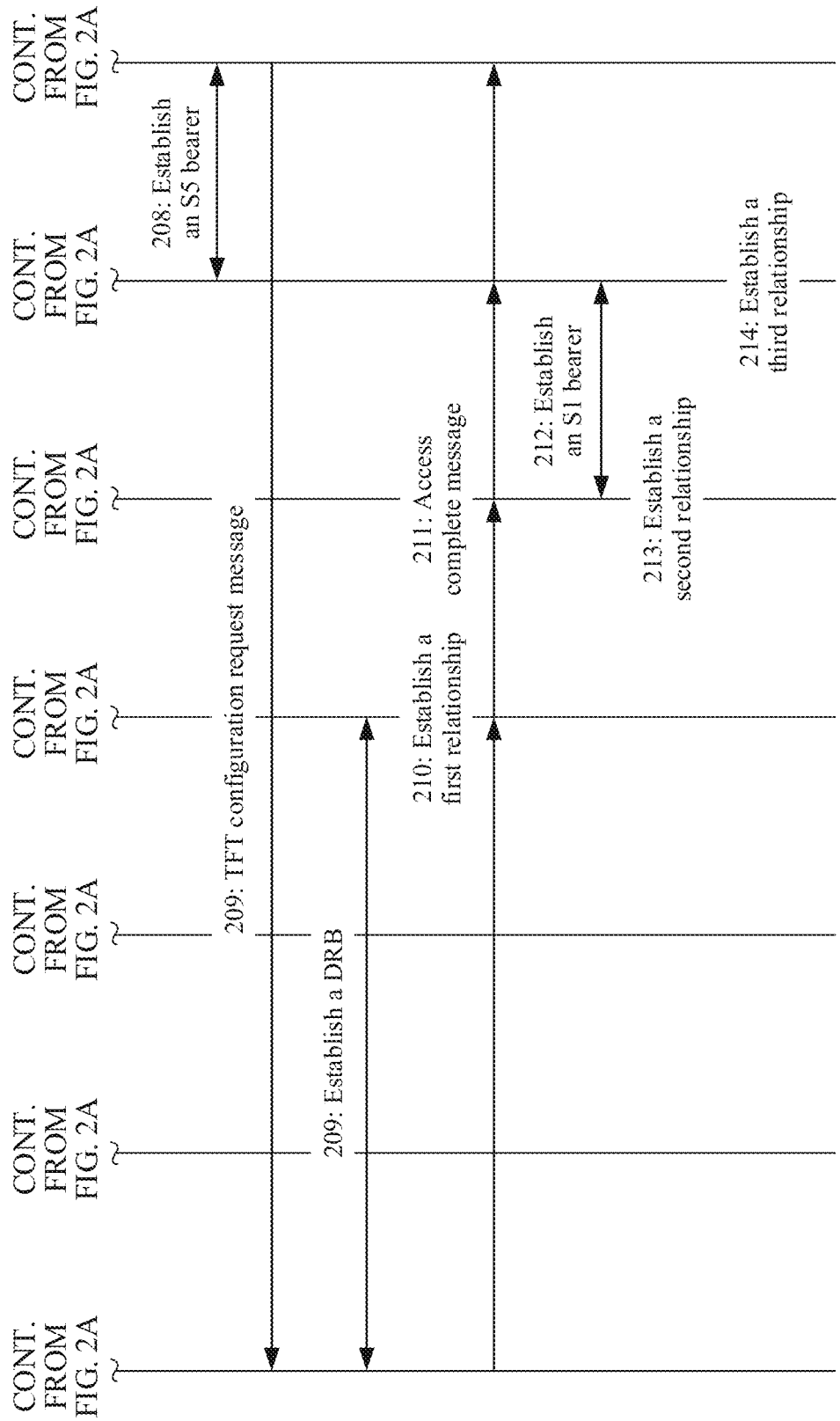

FIG. 2A and FIG. 2B are a schematic flowchart of a multi-hop data transmission method according to an embodiment of this application. The method includes the following steps.

Step 201: When determining that a DRB corresponding to to-be-sent data is not established and a delay of the to-be-sent data is greater than a threshold, a terminal device sends a route establishment request message to a primary base station, where the route establishment request message is used to request to establish route configuration information.

In this embodiment of this application, when the terminal device initiates uplink data transmission, the terminal device adds an IP header to the outside of the to-be-sent data (payload), where the IP header includes a source address, a destination address, and the like. The terminal device traverses data packet filters in a TFT, and if determining that there is a data packet filter including information, of the to-be-sent data, such as a source address, a destination address, a source port number, a destination port number, and a transmission protocol identifier, the terminal device determines that the TFT includes a data packet filter matching the to-be-sent data; if determining that there is no data packet filter including a source address and a destination address of the to-be-sent data, the terminal device determines that the TFT does not include a data packet filter matching the to-be-sent data.

In a first possible scenario, if determining that the TFT includes the data packet filter matching the to-be-sent data, the terminal device determines that the DRB corresponding to the to-be-sent data is already established, and the terminal device may send the to-be-sent data on the DRB corresponding to the data packet filter matching the to-be-sent data. It should be noted that a correspondence between a data packet filter and a DRB is established when the DRB is established. Details are not described herein.

In a second possible scenario, if determining that the TFT does not include the data packet filter matching the to-be-sent data, and the delay of the to-be-sent data is less than or equal to the threshold, the terminal device sends a bearer establishment request to a core network through the primary base station, where the bearer establishment request is used to establish a bearer for transmitting the data through a low frequency link. The terminal device sends the to-be-sent data on the established bearer. For a specific process, refer to descriptions in an LTE standard. Details are not described herein.

It should be noted that the threshold in this embodiment of this application may be set based on an actual situation. When the delay of the to-be-sent data is less than or equal to the threshold, the to-be-sent data may also be referred to as delay-sensitive data, for example, voice data. When the delay of the to-be-sent data is greater than the threshold, the to-be-sent data may also be referred to as delay-insensitive data, for example, video data.

It should be noted that the terminal device may determine, based on a quality of service class identifier (QoS class identifier (QCI)) of the to-be-sent data, the delay of the to-be-sent data. For example, in the current technology, a correspondence between a QCI and a delay may be shown in Table 1.

TABLE 1

| QCI | Delay |
|---|---|
| 1 | 150 ms |
| 2 | 100 ms |
| 3 | 50 ms |
| 4 | 300 ms |
| 5 | 100 ms |

Certainly, Table 1 is merely an example, and there may be another correspondence between a QCI and a delay. Details are not described herein.

In a third possible scenario, that is, the scenario described in step 201, if determining that the TFT does not include the data packet filter matching the to-be-sent data, the terminal device determines that the DRB corresponding to the to-be-sent data is not established.

In this embodiment of this application, the route establishment request message may include a destination address, a source port number, a traffic profile, a QoS parameter, and the like of the to-be-sent data. The traffic profile includes information such as an application type of the to-be-sent data, a traffic file, and a size of each file part. There are four types of QoS parameters: a QCI, an allocation and retention priority (ARP), a guaranteed bit rate (GBR), and an aggregate maximum bit rate (AMBR).

The third possible scenario may be shown in FIG. 3(*a*). In FIG. 3(*a*), there are a plurality of route base stations in signal coverage of the primary base station, and when determining that the DRB corresponding to the to-be-sent data is not established and the delay of the to-be-sent data is greater than the threshold, the terminal device sends the route establishment request message to the primary base station.

Step 202: The primary base station receives the route establishment request message from the terminal device, and sends the route establishment request message to a network management system.

The primary base station may send the route establishment request message to the network management system through an X2 interface. For details, refer to FIG. 3(*b*).

Step 203: The network management system receives the route establishment request message sent by the primary base station, and determines the route configuration information based on the route establishment request message.

The route configuration information is used to indicate a first data transmission path between the terminal device and a serving gateway, the first data transmission path includes at least two route base stations, and the at least two route base stations include a secondary base station of the terminal device. In this embodiment of this application, the route base station may be a small cell with fiber backhaul or a small cell without fiber backhaul, or may be a macro base station.

For example, as shown in FIG. 3(*c*), when a data transmission direction in the first data transmission path is from the terminal device to the serving gateway, data sequentially passes through a route base station A, a route base station B, a route base station C, and a route base station D in the first data transmission path. The uplink data of the terminal device may be sequentially transmitted from the route base station A to the route base station D, and then forwarded by the route base station D to the core network.

In this embodiment of this application, the route configuration information may include at least one routing entry, and each of the at least one routing entry includes the following information:

a source address, where the source address is a network address of a start route base station in the first data transmission path;

a destination address, where the destination address is a network address of an end route base station in the first data transmission path;

an address of a next-hop route base station, where the source address, the destination address, and the address of the next-hop route base station may be IP addresses;

a QCI corresponding to the data of the terminal device; and a time to live (TTL) of the routing entry, where after a TTL of a routing entry expires, the route base station can delete the routing entry.

In this embodiment of this application, one routing entry in the at least one routing entry has an association relationship with one of the at least two route base stations included in the first data transmission path, and the route base station forwards the data of the terminal device based on an address that is of a next-hop route base station and that is in the routing entry that has the association relationship with the route base station. The association relationship between the routing entry and the route base station is pre-agreed. Details are not described herein.

It should be noted that how the network management system specifically determines the route configuration information is not limited in this embodiment of this application. In a possible implementation, the network management system may determine, based on the traffic profile and the QoS parameter in the route establishment request message, route configuration information that meets the QoS parameter and that can implement traffic balancing.

Step 204: The network management system sends the route configuration information to the primary base station.

The network management system may send the route configuration information through the X2 interface.

Step 205: The primary base station obtains the route configuration information, and sends the route configuration information to the at least two route base stations.

It should be noted that the primary base station may obtain the route configuration information sent by the network management system, or may determine the route configuration information based on the route establishment request message sent by the terminal device. This is not limited in this embodiment of this application.

The at least two route base stations are route base stations included in the first data transmission path indicated by the route configuration information.

In this embodiment of this application, the primary base station may sequentially send the route configuration information to the at least two route base stations in a direction opposite to a direction in which the data passes through the at least two route base stations in the first data transmission path. In this way, when the uplink data of the terminal device is sent to one of the at least two route base stations, a case in which the data is discarded because the route base station does not receive the route configuration information can be avoided.

Each of the at least two route base stations may store the route configuration information in a local routing table, where the local routing table includes a plurality of routing entries, and the routing entries in the local routing table may be arranged in ascending order of QCI values or in descending order of hit counts. After a TTL of a routing entry expires, the route base station can delete the routing entry.

In this embodiment of this application, when a data transmission direction in the first data transmission path is from the terminal device to the serving gateway, the primary base station may use, based on the data transmission direction, the start route base station in the first data transmission path as a secondary base station, and indicate, through a low frequency connection, the terminal device to establish a wireless connection to the secondary base station.

When a data transmission direction in the first data transmission path is from the serving gateway to the terminal device, the primary base station may use, based on the data transmission direction, the end route base station in the first data transmission path as a secondary base station, and indicate, through a low frequency connection, the terminal device to establish a wireless connection to the secondary base station.

Figure 3A:
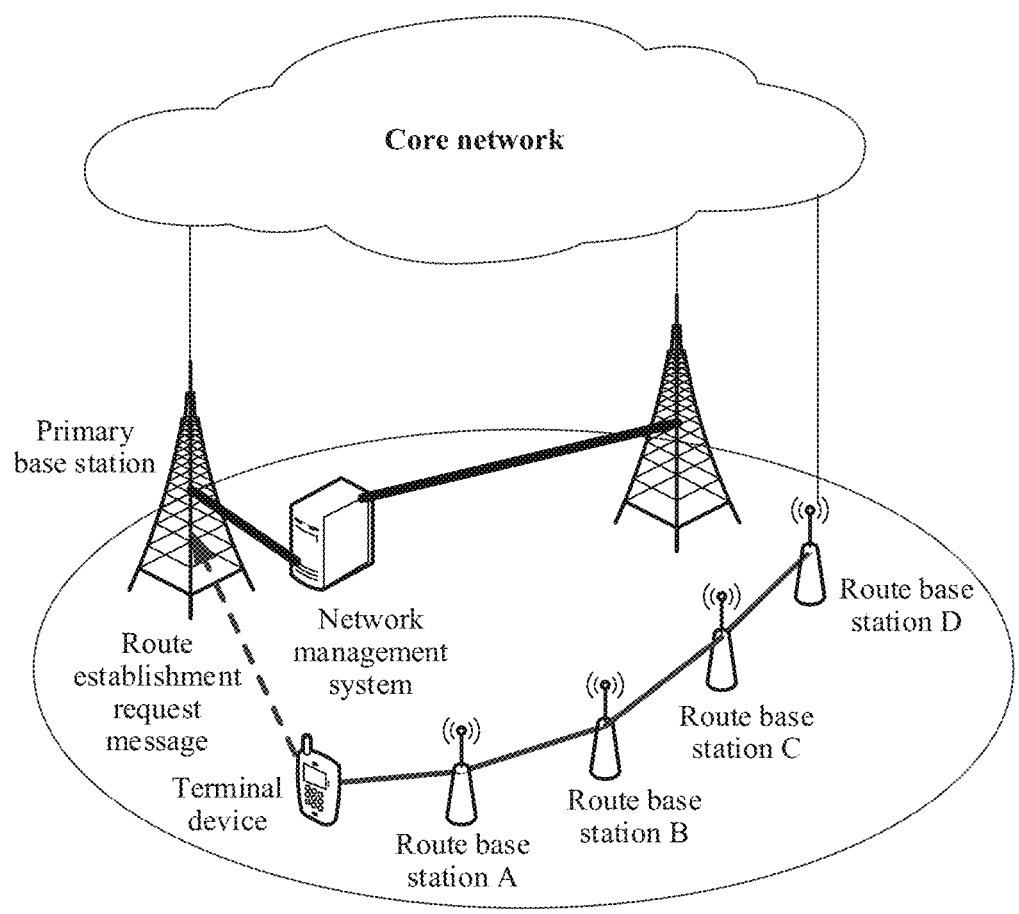
FIG. 3(a) to FIG. 3(d) each are a schematic diagram of a data transmission path according to an embodiment of this application.
Figure 3B:
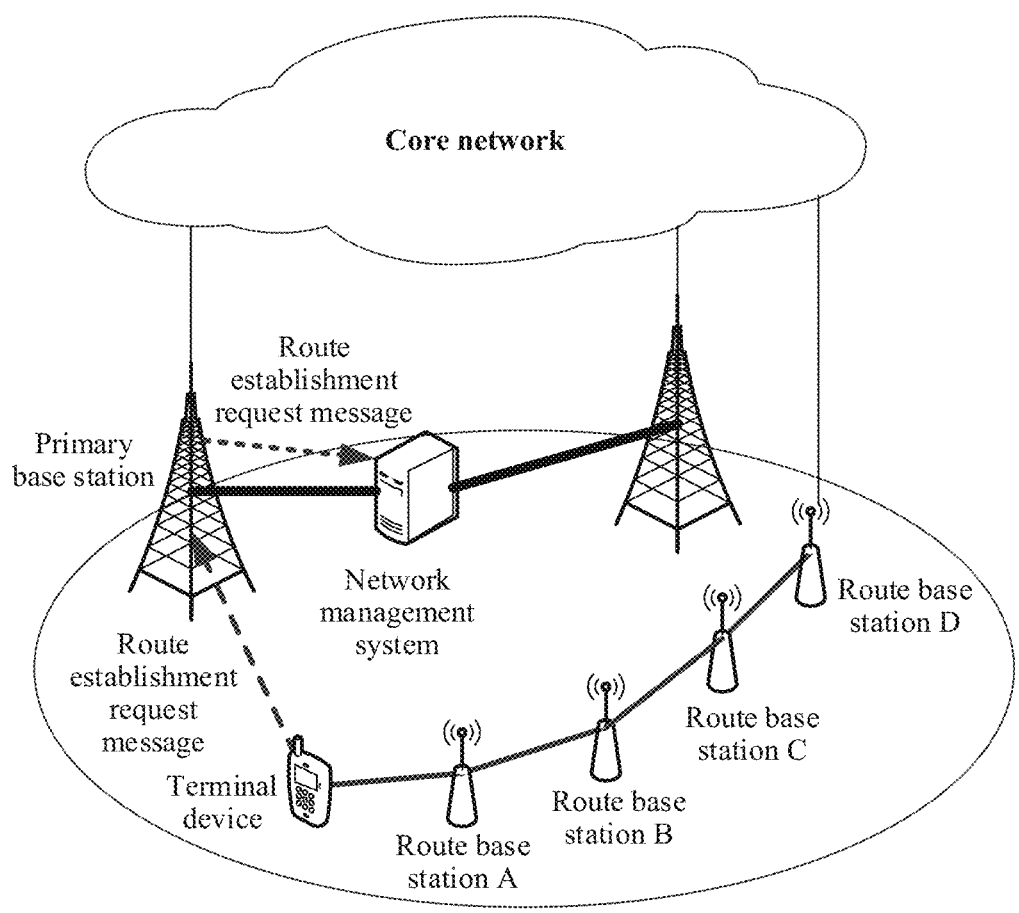
Figure 3C:
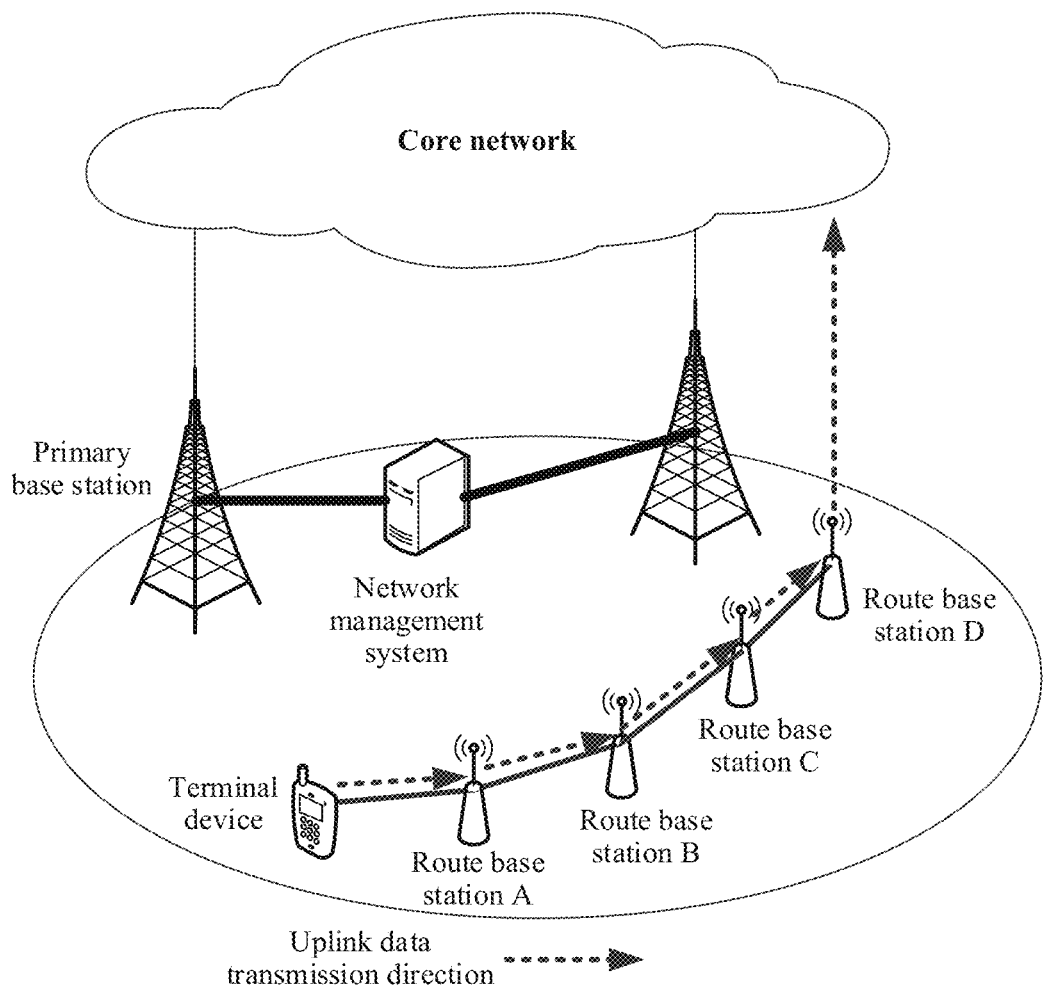
Figure 3D:
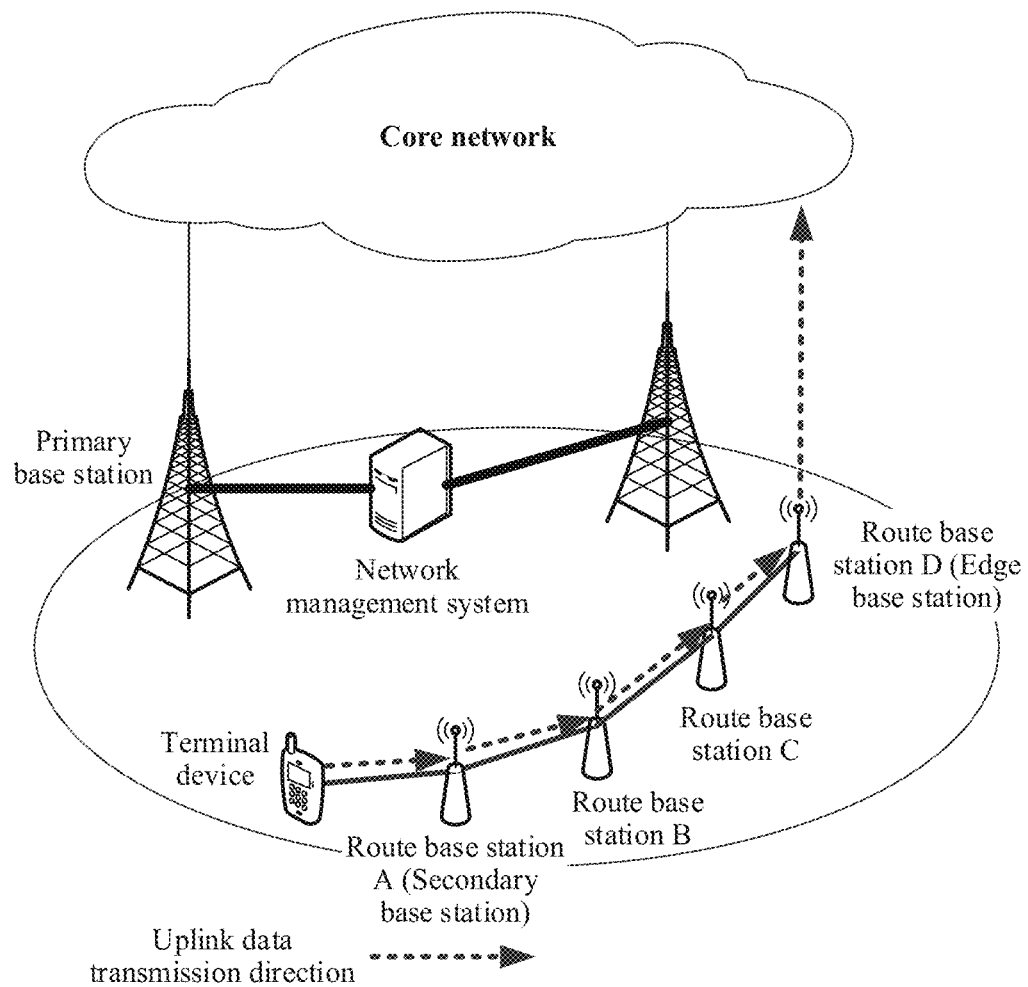

For example, as shown in FIG. 3(d), when a data transmission direction in the first data transmission path is from the terminal device to the serving gateway, data sequentially passes through a route base station A, a route base station B, a route base station C, and a route base station D in the first data transmission path. The primary base station may use the route base station A as the secondary base station. It should be noted that, in this scenario, the route base station D may also be referred to as an edge base station.

Correspondingly, when a data transmission direction in the first data transmission path is from the serving gateway to the terminal device, data sequentially passes through a route base station D, a route base station C, a route base station B, and a route base station A in the first data transmission path. The primary base station may use the route base station A as the secondary base station. It should be noted that, in this scenario, the route base station D may also be referred to as an edge base station.

Step 206: The terminal device establishes the wireless connection to the secondary base station.

It should be noted that the secondary base station is a small cell without fiber backhaul, and the wireless connection may be a high frequency radio resource control (RRC) connection.

In this embodiment of this application, the terminal device communicates with the primary base station through a low frequency link; and the terminal device communicates with the secondary base station through a high frequency link.

Step 207: The terminal device sends an EPS bearer modification request to a data gateway in the core network. The EPS bearer modification request is used to request to establish an S5 bearer.

It should be noted that the terminal device may send the EPS bearer modification request to the secondary base station, the secondary base station forwards the EPS bearer modification request to the primary base station, and then the primary base station forwards the EPS bearer modification request to the data gateway.

It should be noted that the data gateway may be a P-GW, or may be another device having a P-GW function. This is not limited in this embodiment of this application.

Step 208: The data gateway establishes the S5 bearer with the serving gateway, and after the S5 bearer is established, the data gateway sends a TFT configuration request message to the terminal device.

The TFT configuration request message is used to request to: establish a DRB between the terminal device and the secondary base station, and configure a TFT corresponding to the DRB.

It should be noted that a process of establishing the S5 bearer is not limited in this embodiment of this application. Details are not described herein. The serving gateway may be an S-GW, or may be another device having an S-GW function. This is not limited in this embodiment of this application.

Step 209: The terminal device receives the TFT configuration request message from the data gateway, and establishes the DRB between the terminal device and the secondary base station and configures the TFT corresponding to the DRB based on the TFT configuration request message.

A process of establishing the DRB is not limited in this embodiment of this application. Details are not described herein.

In this embodiment of this application, a process in which the terminal device configures the TFT corresponding to the DRB may be as follows:

If determining that there is a first TFT including a DRB identifier of the DRB in the terminal device, and a QCI corresponding to the DRB identifier included in the first TFT is the same as a QCI in the route configuration information, the terminal device adds the data packet filter matching the to-be-sent data to the first TFT.

If determining that there is a first TFT including a DRB identifier of the DRB in the terminal device, and a QCI corresponding to the DRB identifier included in the first TFT is different from a QCI in the route configuration information, the terminal device newly establishes a second TFT, and adds the data packet filter matching the to-be-sent data to the second TFT.

If determining that there is no first TFT including a DRB identifier of the DRB in the terminal device, the terminal device newly establishes a second TFT, and adds the data packet filter matching the to-be-sent data to the second TFT.

It should be noted that the data packet filter includes a 5-tuple: a source address, a destination address, a source port number, a destination port number, and a transport layer protocol identifier. When adding the data packet filter to the TFT, the terminal device may use a 5-tuple of the to-be-sent data of the terminal device as the 5-tuple of the added data packet filter, so as to add the data packet filter matching the to-be-sent data.

Step 210: The secondary base station establishes a first relationship.

The first relationship is a mapping relationship between a network address of an edge base station and the DRB identifier of the DRB, and the edge base station is a route base station that establishes an S1 bearer with the serving gateway and that is in the at least two route base stations, or the edge base station is a device that is in the at least two route base stations and that receives data of the terminal device from the serving gateway or forwards data of the terminal device to the serving gateway. The network address of the edge base station may be an IP address of the edge base station.

It should be noted that the edge base station may be a small cell with fiber backhaul or a macro base station.

Step 211: The terminal device sends an access complete message to the core network through the secondary base station, where the access complete message is used to indicate that the terminal device has accessed the secondary base station.

It should be noted that the access complete message is transmitted to the core network through the first data transmission path indicated by the route configuration information.

After the end route base station, namely, the edge base station, in the first data transmission path receives the access complete message, the access complete message may further trigger establishment of the S1 bearer between the edge base station and the serving gateway.

Step 212: The edge base station establishes the S1 bearer with the serving gateway.

Step 213: The edge base station establishes a second relationship.

The second relationship is a mapping relationship between the DRB identifier and an S1 tunnel endpoint identifier (TEID) of the S1 bearer.

It should be noted that the DRB identifier is sent by the secondary base station to the edge base station, and a specific sending process is not described.

In this embodiment of this application, the edge base station may transmit the data for the terminal device based on the DRB identifier and the second relationship, or the edge base station may transmit the data for the terminal device based on the S1 TEID, the second relationship, and the route configuration information. Details are described below and are not described herein.

Step 214: The serving gateway establishes a third relationship, where the third relationship is a mapping relationship between the S1 TEID of the S1 bearer and an S5 TEID of the S5 bearer.

In the foregoing process, an EPS bearer between an end device and the core network is established, and the data of the terminal device is transmitted on the EPS bearer, so that a QoS requirement of the data can be ensured. In a process of establishing the EPS bearer, a access network further determines the route configuration information of the data of the terminal device during uplink transmission, and each base station from the secondary base station to the edge base station may forward the uplink data of the terminal device based on the route configuration information, so that the access network can support multi-hop data transmission. In addition, mapping of the DRB identifier to the S1 TEID is implemented at the edge base station, so that a multi-hop data transmission process is invisible to the core network, and impact on a current standard can be reduced.

With reference to step 201 to step 214, the following describes in detail a process of transmitting uplink data of a terminal device.

Figure 4:
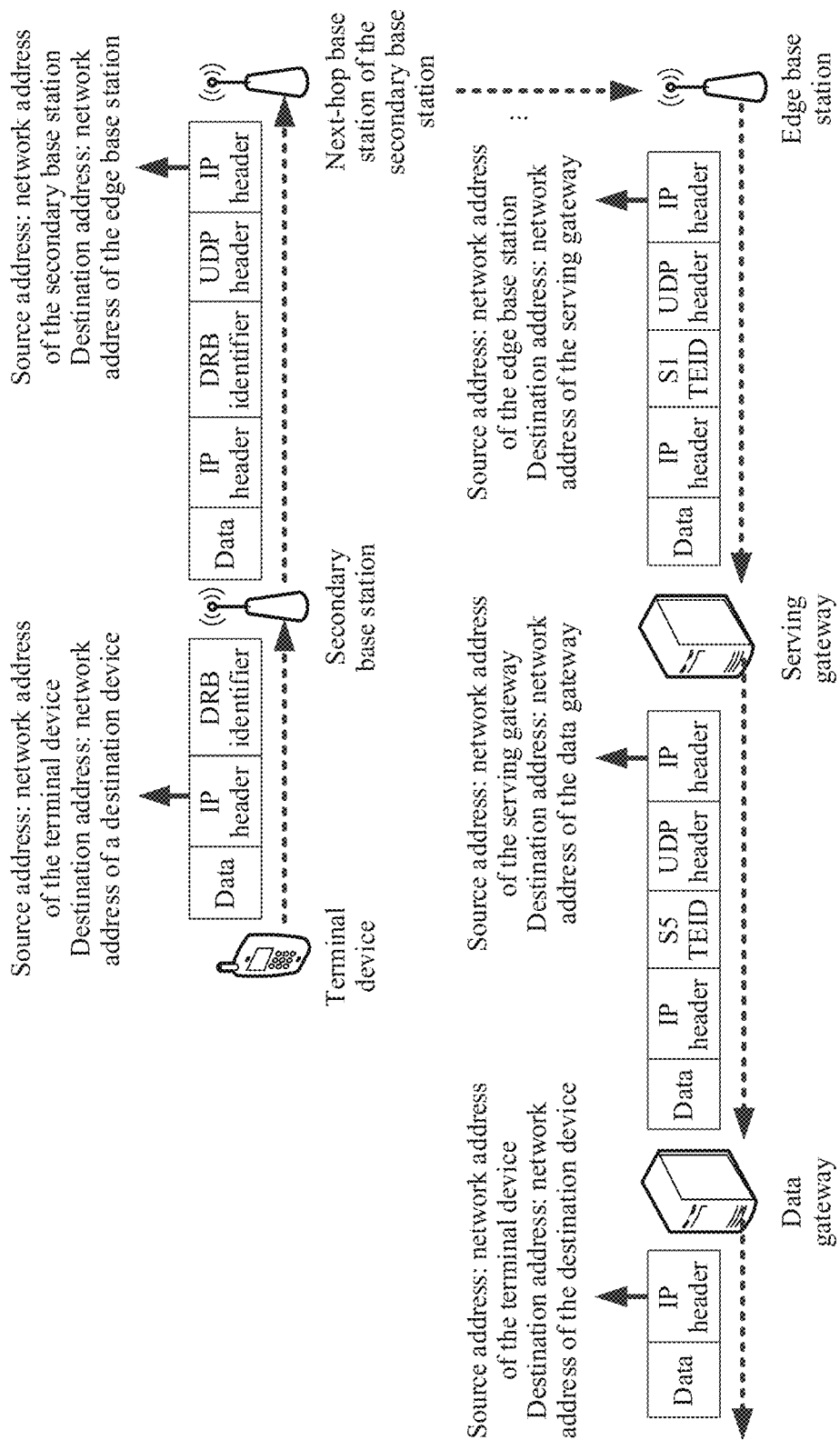
FIG. 4 is a schematic diagram of uplink data transmission according to an embodiment of this application.

FIG. 4 is a schematic flowchart of uplink data transmission according to an embodiment of this application.

Step 1: A terminal device sends an uplink data packet to a secondary base station.

The uplink data packet includes data (payload), a layer-1 header, and a layer-2 header. The layer-1 header is an IP header, and includes content such as a source address and a destination address. The source address is a network address of the terminal device, and the destination address is a network address of a destination device that finally receives the uplink data packet. The layer-2 header includes content such as a DRB identifier. It should be noted that in this embodiment of this application, the network address may be an IP address or the like. Details are not described herein.

The terminal device may determine, based on the destination address of the data that needs to be sent, a TFT that is in the terminal device and that includes the destination address, where the TFT includes the DRB identifier.

It should be noted that the DRB identifier is an identifier of a DRB between the terminal device and the secondary base station.

Step 2: After receiving the uplink data packet from the terminal device, the secondary base station processes the uplink data packet, and sends the processed uplink data packet to a next-hop route base station indicated by route configuration information.

Specifically, the secondary base station determines, in a first relationship, a network address of an edge base station based on the DRB identifier in the uplink data packet. In the procedure shown in FIG. 2A and FIG. 2B, the first relationship is pre-established.

The secondary base station adds a network address header in the uplink data packet, uses the uplink data packet to which the network address header is added as the processed uplink data packet, and sends the processed uplink data packet to the next-hop route base station indicated by the route configuration information.

A source address in the network address header is a network address of the secondary base station, and a destination address in the network address header is the network address of the edge base station.

It should be noted that the network address header added by the secondary base station includes a user datagram protocol (UDP) header and an IP header. For details, refer to descriptions in the current technology. Details are not described herein.

Step 3: After receiving the uplink data packet that is sent by the secondary base station and to which the network address header is added, the next-hop route base station of the secondary base station sends the uplink data packet to a next-hop route base station indicated by the route configuration information.

In a first data transmission path, each base station between the secondary base station and the edge base station forwards the uplink data of the terminal device by using the foregoing method. Details are not described herein again.

Step 4: After receiving the uplink data packet of the terminal device, the edge base station deletes the network address header added by the secondary base station, adds a network address header to the uplink data packet, and sends the uplink data packet to which the network address header is added to a serving gateway on an S1 bearer corresponding to an S1 TEID.

The edge base station may determine, in a second relationship, the S1 TEID based on the DRB identifier in the uplink data packet. After determining the S1 TEID, the edge base station replaces the DRB identifier in the uplink data packet with the S1 TEID.

A source address in the network address header added by the edge base station is the network address of the edge base station, and a destination address in the network address header added by the edge base station is a network address of the serving gateway.

It should be noted that the network address header added by the edge base station includes a UDP header and an IP header. For details, refer to descriptions in the current technology. Details are not described herein.

It should be noted that the S1 TEID is an identifier of an S1 bearer between the serving gateway and the edge base station. In the procedure shown in FIG. 2A and FIG. 2B, the second relationship is pre-established.

Step 5: After receiving the uplink data packet sent by the edge base station, the serving gateway deletes the network address header in the uplink data packet, adds a layer-3 header and a layer-4 header, and sends the uplink data packet to which the layer-3 header and the layer-4 header are added to a data gateway.

The serving gateway may obtain the S1 TEID in the uplink data packet, determine an S5 TEID based on the S1 TEID and a third relationship, and replace the S1 TEID in the uplink data packet with the S5 TEID.

The layer-3 header added by the serving gateway is a UDP header, and the layer-4 header is an IP header. A source address in the layer-4 header is the network address of the serving gateway, and a destination address in the layer-4 header is a network address of the data gateway.

Step 6: The data gateway deletes the layer-2 header, the layer-3 header, and the layer-4 header in the received uplink data packet, reserves only the data and the layer-1 header, and sends the data in the uplink data packet based on the destination address in the layer-1 header.

In addition to a scenario in which a terminal device actively sends uplink data, when a core network side receives downlink data of the terminal device, to send the downlink data of the terminal device, the core network side may also need to initiate downlink route establishment. An example in which a data gateway initiates downlink route establishment is used below for description.

Figure 5A:
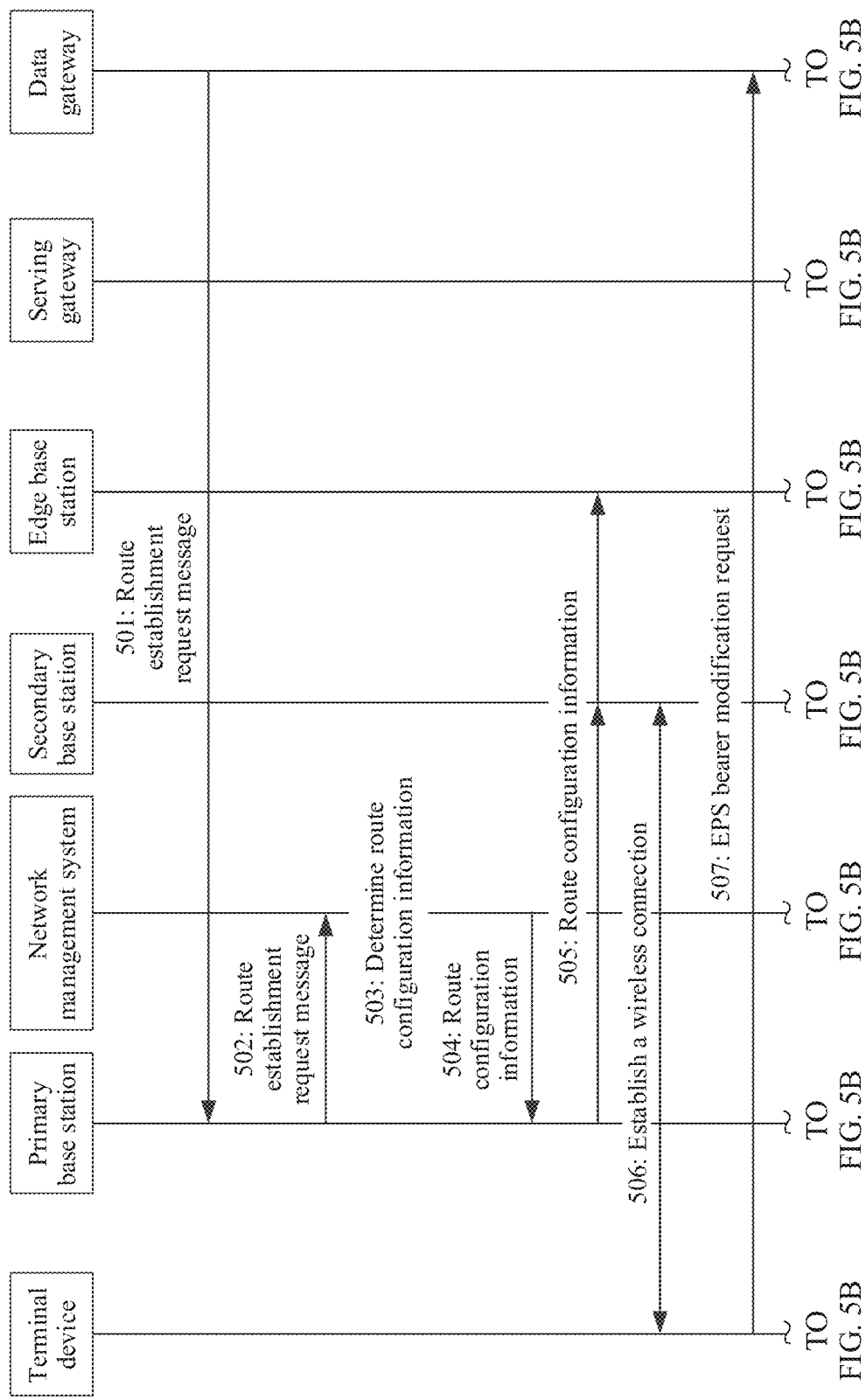
FIG. 5A and FIG. 5B are a schematic flowchart of a multi-hop data transmission method according to an embodiment of this application.
Figure 5B:
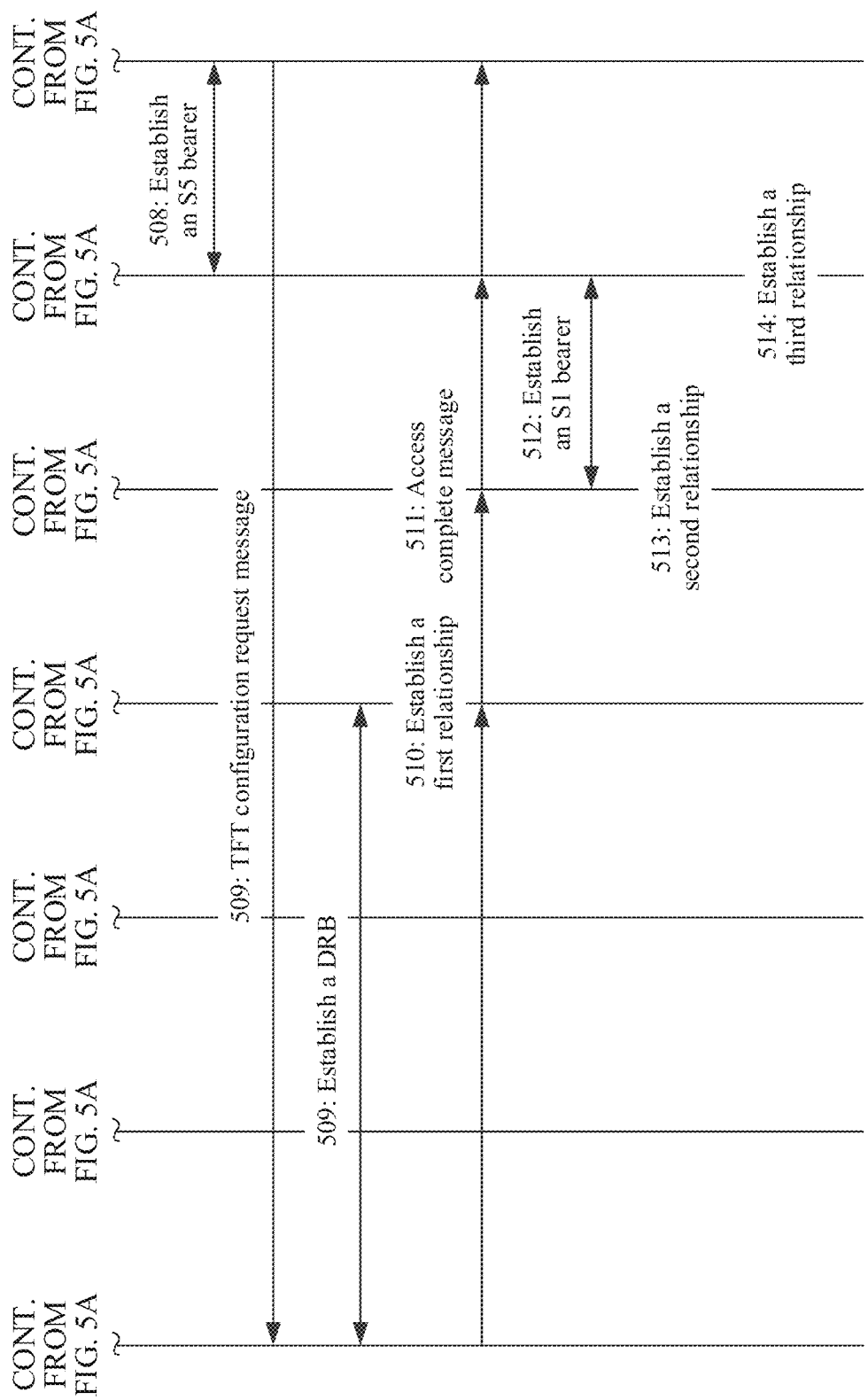

FIG. 5A and FIG. 5B are a schematic flowchart of a multi-hop data transmission method according to an embodiment of this application. The method includes the following steps.

Step 501: When determining that a TFT includes a data packet filter including a destination address of to-be-sent data, the TFT does not include a data packet filter matching the to-be-sent data, and a delay of the to-be-sent data is greater than a threshold, a data gateway sends a route establishment request message to a primary base station, where the route establishment request message is used to request to establish route configuration information.

It should be noted that the data gateway may be a P-GW, or may be another device having a P-GW function. This is not limited in this embodiment of this application.

In this embodiment of this application, when receiving downlink data of the terminal device, the data gateway uses the downlink data as the to-be-sent data. The data gateway traverses data packet filters in the TFT stored in the data gateway, and if determining that there is a data packet filter including a source address and the destination address of the to-be-sent data, the data gateway determines that the TFT includes the data packet filter matching the to-be-sent data; if determining that there is no data packet filter including a source address and the destination address of the to-be-sent data, the data gateway determines that the TFT does not include the data packet filter matching the to-be-sent data.

In a first possible scenario, if determining that the TFT includes the data packet filter matching the to-be-sent data, the data gateway sends the to-be-sent data on an S5 bearer corresponding to the data packet filter matching the to-be-sent data. It should be noted that a correspondence between a data packet filter and an S5 bearer is established when the S5 bearer is established. Details are not described herein.

In a second possible scenario, if determining that the TFT does not include the data packet filter matching the to-be-sent data, and the delay of the to-be-sent data is less than or equal to the threshold, the data gateway sends, on a default bearer, a bearer establishment request to the terminal device through the primary base station connected to the terminal device, where the bearer establishment request is used to establish a bearer for transmitting the data through a low frequency link. Therefore, the to-be-sent data is sent on the established bearer. For a specific process, refer to the current technology. Details are not described herein.

In a third possible scenario, that is, the scenario described in step 501, the data gateway sends the route establishment request message to the primary base station. The route establishment request message may include a destination address, a source port number, a traffic profile, a QoS parameter, and the like of the to-be-sent data. For specific content of the traffic profile and the QoS parameter, refer to the descriptions in step 201. Details are not described herein again.

Step 502: The primary base station receives the route establishment request message from the data gateway, and sends the route establishment request message to a network management system.

The primary base station may send the route establishment request message to the network management system through an X2 interface. For details, refer to FIG. 3(b).

Step 503: The network management system receives the route establishment request message sent by the primary base station, and determines the route configuration information based on the route establishment request message.

The route configuration information is used to indicate a first data transmission path of the data of the terminal device, and the first data transmission path includes at least two route base stations. In this embodiment of this application, the route base station may be a small cell with fiber backhaul or a small cell without fiber backhaul, or may be a macro base station.

In this embodiment of this application, the route configuration information may include at least one routing entry. For specific content of the routing entry, refer to the descriptions in step 203. Details are not described herein again.

It should be noted that how the network management system specifically determines the route configuration information is not limited in this embodiment of this application. In a possible implementation, the network management system may determine, based on the traffic profile and the QoS parameter in the route establishment request message, route configuration information that meets the QoS parameter and that can implement traffic balancing.

Step 504: The network management system sends the route configuration information to the primary base station.

The network management system may send the route configuration information through the X2 interface.

Step 505: The primary base station obtains the route configuration information, and sends the route configuration information to the at least two route base stations.

It should be noted that the primary base station may obtain the route configuration information sent by the network management system, or may determine the route configuration information based on the route establishment request message sent by the terminal device. This is not limited in this embodiment of this application.

The at least two route base stations are route base stations included in the first data transmission path indicated by the route configuration information.

In this embodiment of this application, the primary base station may sequentially send the route configuration information to the at least two route base stations in a direction opposite to a direction in which the data passes through the at least two route base stations in the first data transmission path. To be specific, the primary base station sequentially sends the route configuration information in a sequence from an end route base station to a start route base station in the first data transmission path. In this way, when the downlink data of the terminal device is sent to one of the at least two route base stations, a case in which the data cannot be forwarded because the route base station does not receive the route configuration information can be avoided.

Each of the at least two route base stations may store the route configuration information in a local routing table, where the local routing table includes a plurality of routing entries, and the routing entries in the local routing table may be arranged in ascending order of QCI values or in descending order of hit counts. After a TTL of a routing entry expires, the route base station can delete the routing entry.

In this embodiment of this application, the primary base station may determine a secondary base station based on the route base station included in the first data transmission path, and indicate the secondary base station to the terminal device. For details, refer to the descriptions in step 206. Details are not described herein again.

Step 506: The terminal device establishes a wireless connection to the secondary base station.

It should be noted that the secondary base station is a small cell without fiber backhaul, and the wireless connection may be a high frequency RRC connection.

Step 507: The terminal device sends an EPS bearer modification request to the data gateway in a core network. The EPS bearer modification request is used to request to establish an S5 bearer.

It should be noted that the terminal device may send the EPS bearer modification request to the secondary base station, the secondary base station forwards the EPS bearer modification request to the primary base station, and then the primary base station forwards the EPS bearer modification request to the data gateway.

Step 508: The data gateway establishes the S5 bearer with a serving gateway, and after the S5 bearer is established, the data gateway sends a TFT configuration request message to the terminal device.

The TFT configuration request message is used to request to: establish a DRB between the terminal device and the secondary base station, and configure a TFT corresponding to the DRB.

It should be noted that a process of establishing the S5 bearer is not limited in this embodiment of this application. Details are not described herein. The serving gateway may be an S-GW, or may be another device having an S-GW function. This is not limited in this embodiment of this application.

Step 509: The terminal device receives the TFT configuration request message from the data gateway, and establishes the DRB between the terminal device and the secondary base station and configures the TFT corresponding to the DRB based on the TFT configuration request message.

A process of establishing the DRB is not limited in this embodiment of this application. Details are not described herein.

In this embodiment of this application, a process in which the terminal device configures the TFT corresponding to the DRB may be as follows:

If determining that there is a first TFT including a DRB identifier of the DRB in the terminal device, and a QCI corresponding to the DRB identifier included in the first TFT is the same as a QCI in the route configuration information, the terminal device adds the data packet filter matching the to-be-sent data to the first TFT.

If determining that there is a first TFT including a DRB identifier of the DRB in the terminal device, and a QCI corresponding to the DRB identifier included in the first TFT is different from a QCI in the route configuration information, the terminal device newly establishes a second TFT, and adds the data packet filter matching the to-be-sent data to the second TFT.

If determining that there is no first TFT including a DRB identifier of the DRB in the terminal device, the terminal device newly establishes a second TFT, and adds the data packet filter matching the to-be-sent data to the second TFT.

It should be noted that the data packet filter includes a 5-tuple: a source address, a destination address, a source port number, a destination port number, and a transport layer protocol identifier. When adding the data packet filter to the TFT, the terminal device may use a 5-tuple of the to-be-sent data of the terminal device as the 5-tuple of the added data packet filter, so as to add the data packet filter matching the to-be-sent data.

Step 510: The secondary base station establishes a first relationship.

The first relationship is a mapping relationship between a network address of an edge base station and the DRB identifier of the DRB, and the edge base station is a device that is in the at least two route base stations and that receives data of the terminal device from the serving gateway or forwards data of the terminal device to the serving gateway. The network address of the edge base station may be an IP address of the edge base station.

It should be noted that the edge base station is a small cell with fiber backhaul or a macro base station.

Step 511: The terminal device sends an access complete message to the core network through the secondary base station, where the access complete message is used to indicate that the terminal device has accessed the secondary base station.

It should be noted that the access complete message is transmitted to the core network through the first data transmission path indicated by the route configuration information.

After the edge base station in the first data transmission path receives the access complete message, the access complete message may further trigger establishment of an S1 bearer between the edge base station and the serving gateway.

Step 512: The edge base station establishes the S1 bearer with the serving gateway.

Step 513: The edge base station establishes a second relationship.

The second relationship is a mapping relationship between the DRB identifier and an S1 TEID of the S1 bearer.

It should be noted that the DRB identifier is sent by the secondary base station to the edge base station, and a specific sending process is not described.

In this embodiment of this application, the edge base station may transmit the data for the terminal device based on the DRB identifier and the second relationship, or the edge base station may transmit the data for the terminal device based on the S1 TEID, the second relationship, and the route configuration information. Details are described below and are not described herein.

Step 514: The serving gateway establishes a third relationship, where the third relationship is a mapping relationship between the S1 TEID of the S1 bearer and an S5 TEID of the S5 bearer.

In the foregoing process, an EPS bearer between an end device and the core network is established, and the data of the terminal device is transmitted on the EPS bearer, so that a QoS requirement of the data can be ensured. In a process of establishing the EPS bearer, a network side further determines the route configuration information of the data of the terminal device during downlink transmission, and each base station from the secondary base station to the edge base station may forward the downlink data of the terminal device based on the route configuration information, so that the access network side can support multi-hop data transmission. In addition, mapping of the DRB identifier to the S1 TEID is implemented at the edge base station, so that a multi-hop data transmission process is invisible to the core network, and impact on a current standard can be reduced.

With reference to step 501 to step 514, the following describes in detail a process of transmitting downlink data of a terminal device.

Figure 6:
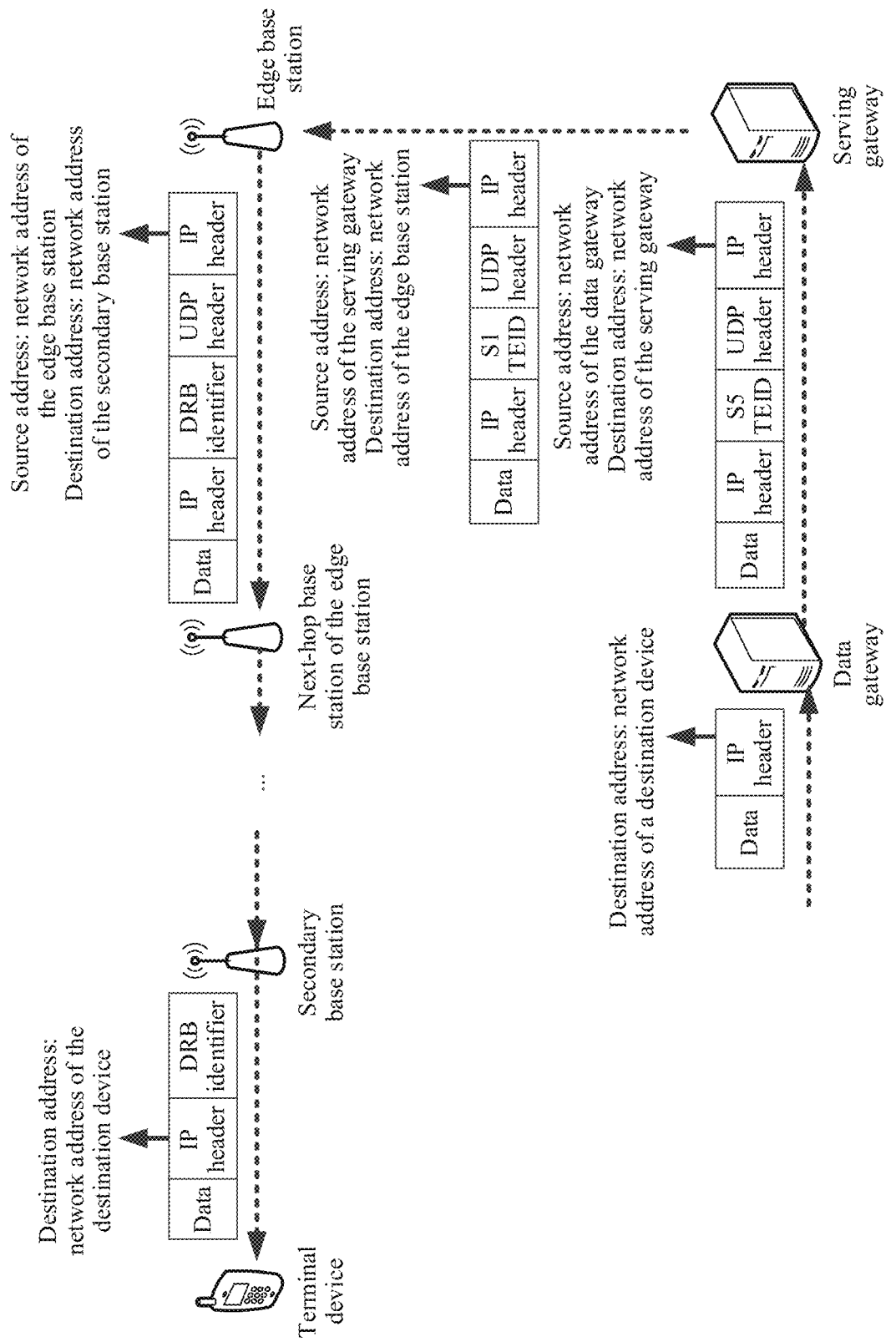
FIG. 6 is a schematic diagram of downlink data transmission according to an embodiment of this application.

FIG. 6 is a schematic flowchart of downlink data transmission according to an embodiment of this application.

Step 1: A data gateway sends a downlink data packet of a terminal device to a serving gateway.

The downlink data packet includes data (payload), a layer-1 header, a layer-2 header, a layer-3 header, and a layer-4 header.

The data and the layer-1 header in the downlink data packet are received by the serving gateway, and the serving gateway encapsulates the layer-2 header, the layer-3 header, and the layer-4 header in the received data and layer-1 header.

The layer-1 header is an IP header of the data received by the serving gateway, and includes content such as a source address and a destination address. The source address is a network address of a device that sends the data to the terminal device, and the destination address is a network address of the terminal device. The layer-2 header includes content such as an S5 TEID. The layer-3 header is a UDP header, and the layer-4 header is an IP header including content such as a source address and a destination address. A source address in the layer-4 header is a network address of the data gateway, and a destination address in the layer-4 header is a network address of the serving gateway.

The data gateway may determine, based on the destination address of the received data, a TFT that is in the data gateway and that includes the destination address, where the TFT includes the S5 TEID.

It should be noted that the S5 TEID is an identifier of an S5 bearer between the serving gateway and the data gateway.

Step 2: After receiving the downlink data packet, the serving gateway deletes the layer-3 header and the layer-4 header in the downlink data packet, adds a new layer-3 header and a new layer-4 header, replaces the S5 TEID in the downlink data packet with an S1 TEID, and sends the downlink data packet to an edge base station.

The serving gateway may obtain the S5 TEID in the downlink data packet, and determine the S1 TEID based on the S5 TEID and a third relationship. The new layer-3 header is a UDP header, and the new layer-4 header is an IP header. A source address in the new layer-4 header is the network address of the serving gateway, and a destination address in the new layer-4 header is a network address of the edge base station.

Step 3: After receiving the downlink data packet, the edge base station determines, in a second relationship, a DRB identifier based on the S1 TEID in the downlink data packet, and replaces the S1 TEID in the downlink data packet with the DRB identifier.

In the procedure shown in FIG. 5A and FIG. 5B, the second relationship is pre-established.

Step 4: The edge base station deletes the new layer-3 header and the new layer-4 header that are added by the serving gateway, adds a network address header in the downlink data packet, and sends the downlink data packet to which the network address header is added to a next-hop route base station indicated by route configuration information.

It should be noted that the network address header added by the edge base station includes a UDP header and an IP header. For details, refer to descriptions in the current technology. Details are not described herein. A source address in the network address header is the network address of the edge base station, and a destination address in the network address header is a network address of a secondary base station.

Step 5: After receiving the downlink data packet that is sent by the edge base station and to which the network address header is added, the next-hop route base station of the edge base station sends the downlink data packet to a next-hop route base station indicated by the route configuration information.

In a first data transmission path, each base station between the secondary base station and the edge base station forwards the downlink data of the terminal device by using the foregoing method. Details are not described herein again.

Step 6: After receiving the downlink data packet of the terminal device, the secondary base station sends the downlink data packet to the terminal device on a DRB corresponding to the DRB identifier.

Before sending the downlink data packet to the terminal device, the secondary base station first deletes the network address header added by the edge base station, determines, in a first relationship, the DRB identifier based on the S1 TEID in the downlink data packet, and replaces the S1 TEID in the downlink data packet with the DRB identifier.

It should be noted that, in the procedure shown in FIG. 5A and FIG. 5B, the first relationship is pre-established.

According to the foregoing procedure, the downlink data that is of the terminal device and that is received from a network side may be sent to the terminal device.

In the embodiments of this application, the route configuration information may be updated based on an actual situation, to meet the QoS requirement of the data of the terminal device. Different cases are separately described below:

In a first possible scenario, when determining that channel quality between the terminal device and the secondary base station accessed by the terminal device is less than a preset channel quality value, the secondary base station requests to update the route configuration information.

Specifically, after accessing the secondary base station, the terminal device periodically sends quality report (match report) signaling to the secondary base station, where the quality report signaling includes channel quality information, and the channel quality information is used to indicate the channel quality value between the secondary base station and the terminal device. When determining, based on the quality report signaling, that the channel quality value between the secondary base station and the terminal device is less than the preset channel quality value, the secondary base station may send a route change request message to the primary base station, where the route change request message is used to request to update the route configuration information, and the route change request message includes content such as a traffic profile and a QoS parameter. The primary base station may send the route change request message to the network management system through the X2 interface, to indicate the network management system to update the route configuration information.

Figure 7:
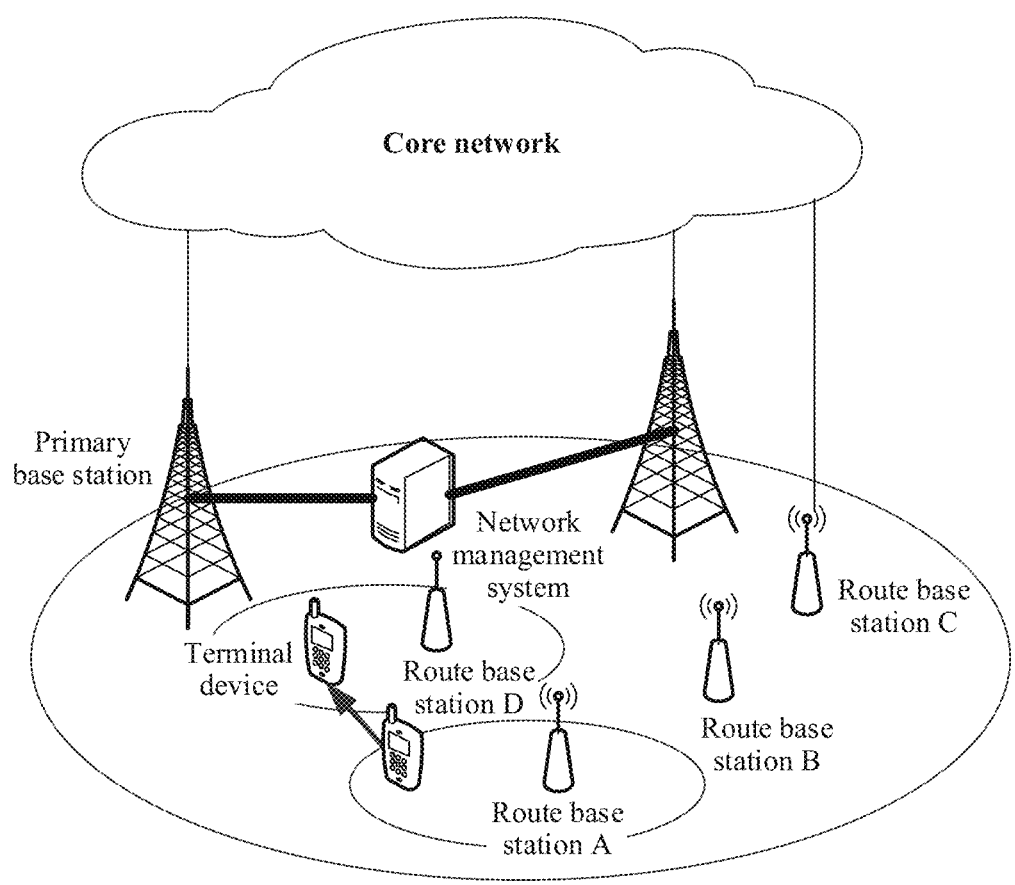
FIG. 7 is a schematic diagram of a data transmission path according to an embodiment of this application.

For example, as shown in FIG. 7, the terminal device accesses a route base station A. When the terminal device moves to signal coverage of a route base station D, channel quality between the terminal device and the route base station A deteriorates. In this case, the route base station A may send a route change request message to the primary base station, to update a transmission path of the data of the terminal device.

In a second possible scenario, when detecting a topology of the first data transmission path changes, the primary base station may send a topology change message to the network management system through the X2 interface, to indicate the network management system to update the route configuration information. The topology change message includes content such as a traffic profile and a QoS parameter.

Figure 8:
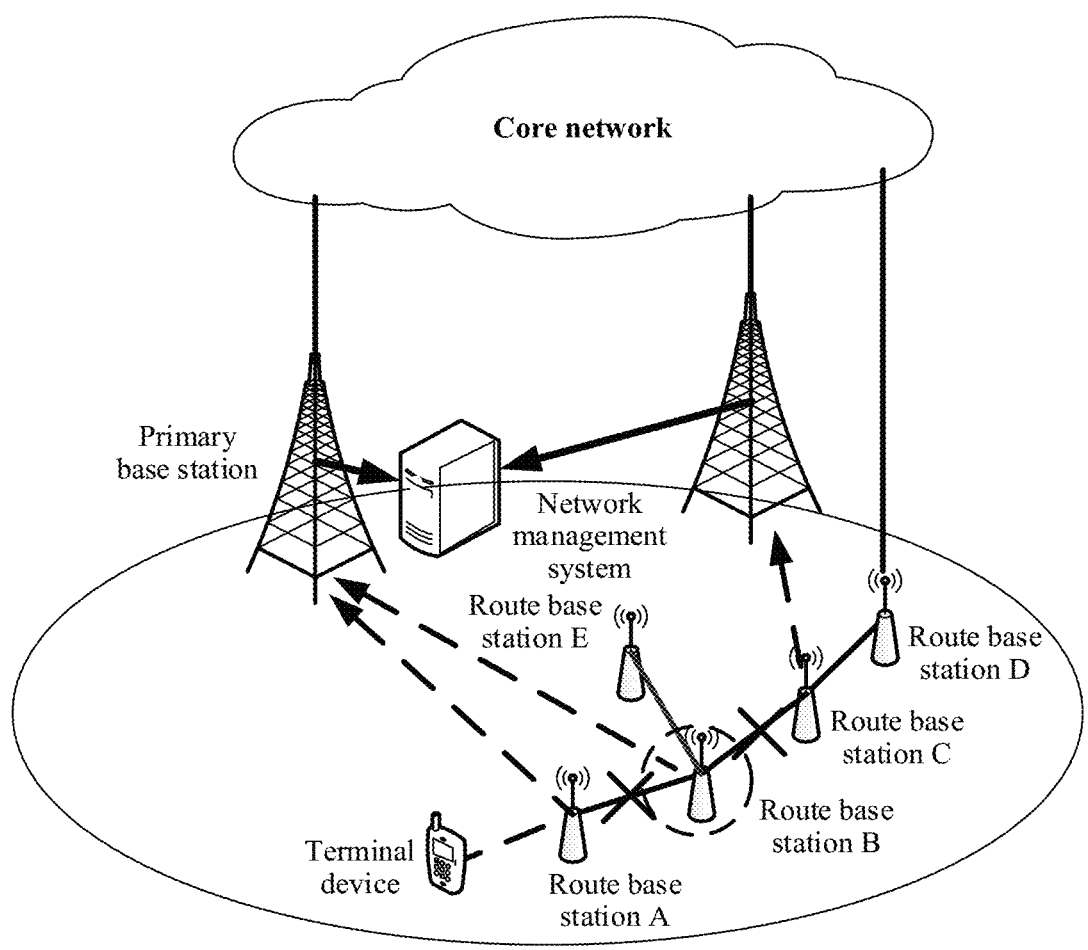
FIG. 8 is a schematic diagram of a data transmission path according to an embodiment of this application.

For example, as shown in FIG. 8, the data of the terminal device sequentially passes through a route base station A, a route base station B, a route base station C, and a route base station D. When detecting that the route base station B is in a disabled state due to reasons such as a fault and the like, the primary base station may send a topology change message to the network management system, to update a transmission path of the data of the terminal device.

After receiving the route change request message or the topology change message, the network management system updates the route configuration information, and sends updated route configuration information to the primary base station. The updated route configuration information is used to indicate a second data transmission path of the data of the terminal device, and the second data transmission path includes at least two route base stations.

After the route configuration information is updated, the first data transmission path is no longer used, and the data of the terminal device needs to be transmitted through the second data transmission path. Therefore, the primary base station needs to redeliver the updated route configuration information to the route base stations in the second data transmission path, and when a start route base station and an end route base station in the second data transmission path are the same as a start route base station and an end route base station in the first data transmission path, the primary base station may perform configuration in the following manners:

1. For a route base station newly added to the second data transmission path relative to the first data transmission path, the primary base station may deliver the updated route configuration information to the route base station.

2. For a route base station that is already deleted from the first data transmission path and that is not in the second data transmission path, the primary base station may indicate the route base station to delete the route configuration information.

3. For a route base station located in both the first data transmission path and the second data transmission path, if a next-hop route base station of the route base station changes, the primary base station may deliver the updated route configuration information to the route base station.

4. For a route base station located in both the first data transmission path and the second data transmission path, if a next-hop route base station of the route base station does not change, the route configuration information in the route base station may remain unchanged.

It should be noted that, when the start route base station and the end route base station in the second data transmission path are the same as the start route base station and the end route base station in the first data transmission path, the core network does not need to be notified, that is, a route change of the terminal device in the access network side is invisible to the core network.

When the start route base station and the end route base station in the second data transmission path are different from the start route base station and the end route base station in the first data transmission path, the primary base station may send the updated route configuration information to all the route base stations in the second data transmission path.

Further, when determining that the secondary base station accessed by the terminal device changes to a first base station, the primary base station may further indicate the terminal device to establish a DRB with the first base station, where the first base station is a route base station included in the second data transmission path.

It should be noted that in a process of establishing the DRB, the first base station needs to establish a correspondence between the network address of the edge base station and a DRB identifier. For details, refer to the foregoing descriptions. Details are not described herein again.

Further, when determining that the edge base station changes to a second base station, the primary base station may further indicate the second base station to establish an S1 bearer with the serving gateway, where the second base station is a route base station included in the second data transmission path.

It should be noted that in a process of establishing the S1 bearer, the second base station needs to establish a correspondence between the DRB identifier and an S1 TEID. For details, refer to the foregoing descriptions. Details are not described herein again.

Figure 9:
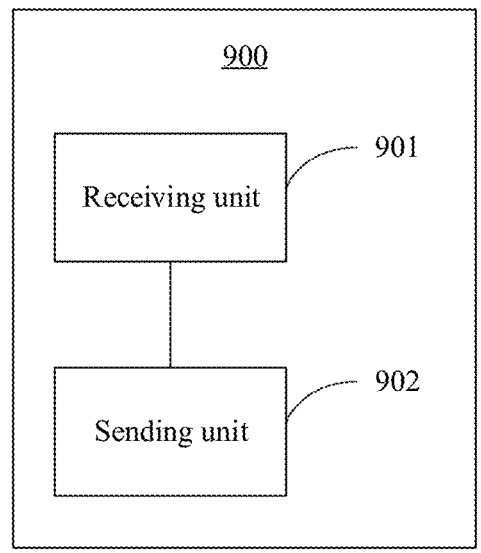
FIG. 9 is a schematic structural diagram of a multi-hop data transmission apparatus according to an embodiment of this application.

FIG. 9 is a schematic structural diagram of a multi-hop data transmission apparatus according to an embodiment of this application.

The apparatus 900 includes:

a receiving unit 901, configured to obtain route configuration information, where the route configuration information is used to indicate a first data transmission path between a terminal device and a serving gateway, the first data transmission path includes at least two route base stations, and the at least two route base stations include a secondary base station of the terminal device; and a sending unit 902, configured to send the route configuration information to the at least two route base stations.

In a possible design, the receiving unit 901 is specifically configured to:

receive the route configuration information from a network management system.

In a possible design, the receiving unit 901 is further configured to:

receive a route establishment request message from the terminal device or a data gateway, where the route establishment request message is used to request to establish the route configuration information; and the sending unit 902 is further configured to send the route establishment request message to the network management system.

In a possible design, the sending unit 902 is specifically configured to:

sequentially send the route configuration information to the at least two route base stations in a direction opposite to a direction in which data passes through the at least two route base stations in the first data transmission path.

Figure 10:
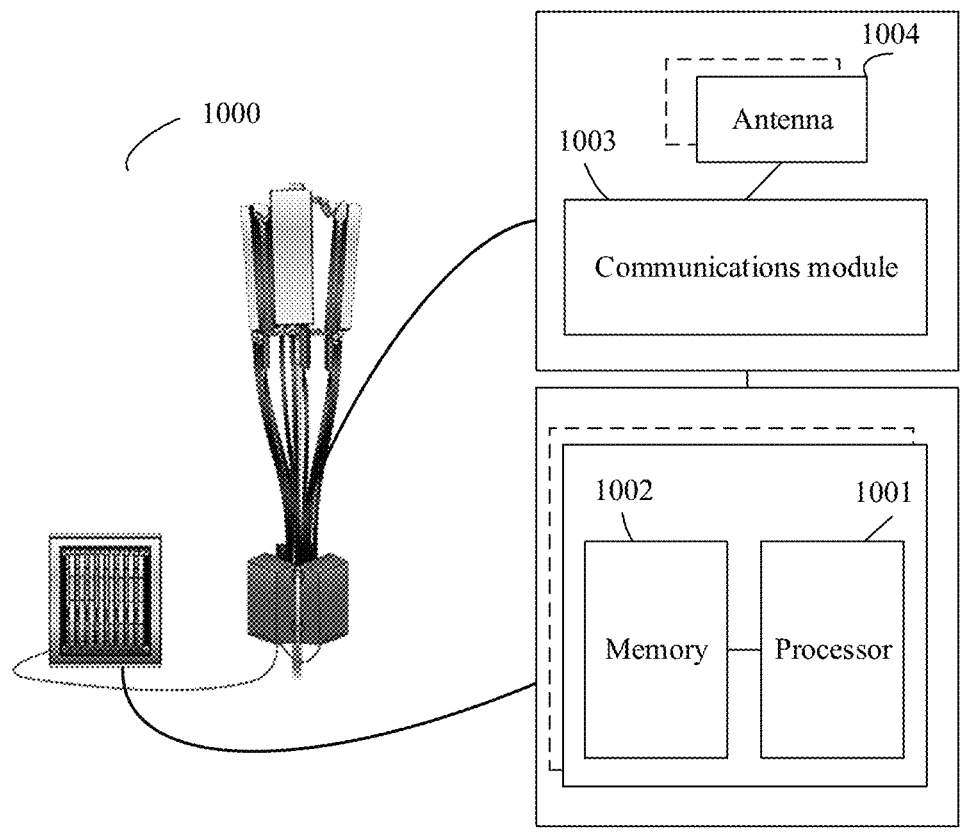
FIG. 10 is a schematic structural diagram of a multi-hop data transmission apparatus according to an embodiment of this application.

FIG. 10 is a schematic structural diagram of a communications apparatus according to an embodiment of this application. The communications apparatus shown in FIG. 10 may be an implementation of a hardware circuit of the communications apparatus shown in FIG. 9. The communications apparatus may be applicable to the flowchart shown in FIG. 2A and FIG. 2B or in FIG. 5A and FIG. 5B, and performs functions of the primary base station in the foregoing method embodiment. For ease of description, FIG. 10 shows only main components of the communications apparatus. Optionally, the communications apparatus may be a base station, or may be an apparatus, for example, a chip or a chip system, in a base station. The chip system includes at least one chip, and the chip system may further include another circuit structure and/or discrete component. Optionally, that the communications apparatus is the base station is used as an example. As shown in FIG. 10, the communications apparatus 1000 includes a processor 1001, a memory 1002, a communications module 1003, an antenna 1004, and the like. The processor 1001 is mainly configured to: process a communication protocol and communication data; control the entire communications apparatus; execute a software program; and process data of the software program. For example, the processor 1001 is configured to support the wireless communications apparatus in performing actions described in the foregoing method embodiment. The memory 1002 is mainly configured to store the software program and data. The communications module 1003 is mainly configured to perform conversion between a baseband signal and a radio frequency signal and processing of the radio frequency signal, and may further support fiber communication. The antenna 1004 is mainly configured to receive and send a radio frequency signal in a form of an electromagnetic wave.

The communications apparatus 1000 is configured to perform functions of the primary base station in the flowchart shown in FIG. 2A and FIG. 2B or in FIG. 5A and FIG. 5B. For details, refer to the foregoing descriptions. Details are not described herein again.

The processor 1001 is configured to obtain route configuration information through the communications module 1003, where the route configuration information is used to indicate a first data transmission path between a terminal device and a serving gateway, the first data transmission path includes at least two route base stations, and the at least two route base stations include a secondary base station of the terminal device; and the processor 1001 is configured to send the route configuration information to the at least two route base stations through the communications module 1003.

In a possible design, the communications module 1003 is specifically configured to:

receive the route configuration information from a network management system.

In a possible design, the communications module 1003 is further configured to:

receive a route establishment request message from the terminal device or a data gateway, where the route establishment request message is used to request to establish the route configuration information; and the communications module 1003 is further configured to send the route establishment request message to the network management system.

In a possible design, the communications module 1003 is specifically configured to:

sequentially send the route configuration information to the at least two route base stations in a direction opposite to a direction in which data passes through the at least two route base stations in the first data transmission path.

Figure 11:
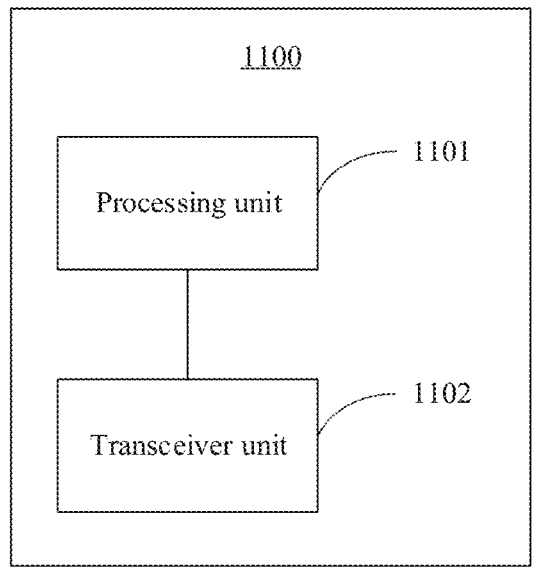
FIG. 11 is a schematic structural diagram of a multi-hop data transmission apparatus according to an embodiment of this application.

FIG. 11 is a schematic structural diagram of a multi-hop data transmission apparatus according to an embodiment of this application.

The apparatus 1100 includes: a processing unit 1101, configured to: when determining that a data radio bearer DRB corresponding to to-be-sent data is not established and a delay of the to-be-sent data is greater than a threshold, determine a route establishment request message, where the route establishment request message is used to request to establish route configuration information; and a transceiver unit 1102, configured to send the route establishment request message to a primary base station.

In a possible design, the transceiver unit 1102 is further configured to:

receive a TFT configuration request message from a data gateway, where the TFT configuration request message is used to request to: establish a data radio bearer DRB, and configure a TFT corresponding to the DRB;

the processing unit 1101 establishes the DRB between the apparatus and a secondary base station based on the TFT configuration request message; and if determining that there is a first TFT corresponding to the DRB, and a quality of service class identifier QCI corresponding to the first TFT is the same as a QCI of the data transmitted on the DRB, the processing unit 1101 adds a data packet filter matching the to-be-sent data to the first TFT; or if determining that there is a first TFT corresponding to the DRB, and a QCI corresponding to the first TFT is different from a QCI of the data transmitted on the DRB, the processing unit 1101 newly establishes a second TFT, and adds a data packet filter matching the to-be-sent data to the second TFT; or if determining that there is no first TFT corresponding to the DRB, the processing unit 1101 newly establishes a second TFT, and adds a data packet filter matching the to-be-sent data to the second TFT.

In a possible design, the processing unit 1101 is specifically configured to:

when a traffic flow template TFT does not include the data packet filter matching the to-be-sent data, determine that the DRB is not established.

Figure 12:
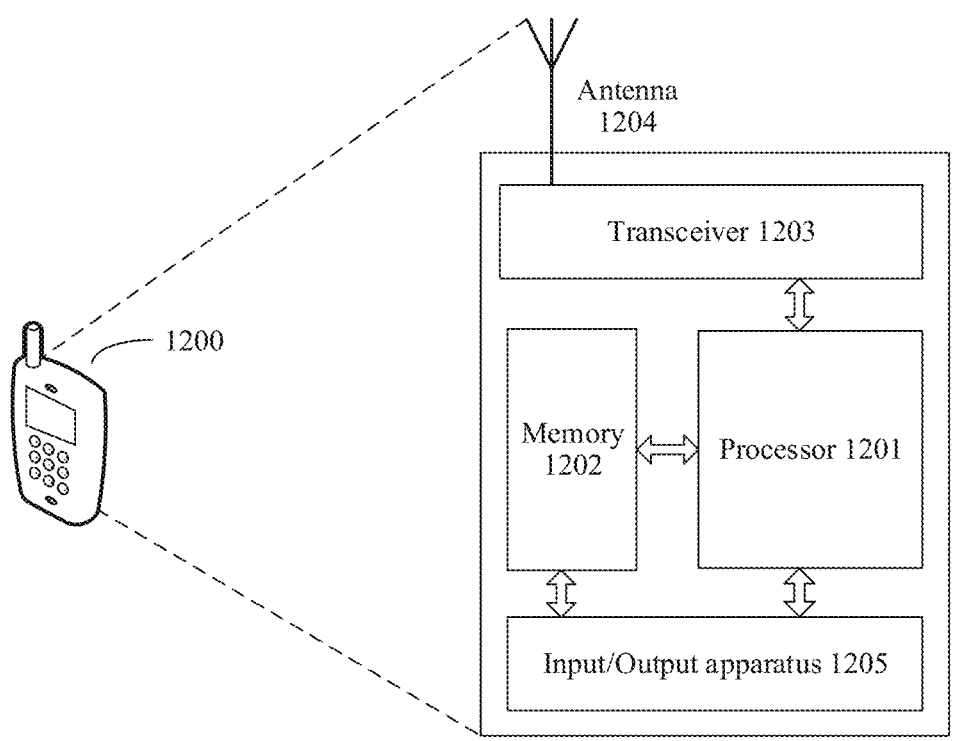
FIG. 12 is a schematic structural diagram of a multi-hop data transmission apparatus according to an embodiment of this application.

FIG. 12 is a schematic structural diagram of a communications apparatus according to an embodiment of this application. The communications apparatus shown in FIG. 12 may be an implementation of a hardware circuit of the communications apparatus shown in FIG. 11. The communications apparatus may be applicable to the flowchart shown in FIG. 2A and FIG. 2B or in FIG. 5A and FIG. 5B, and performs functions of the terminal device in the foregoing method embodiment. For ease of description, FIG. 12 shows only main components of the communications apparatus. Optionally, the communications apparatus may be a terminal device, or may be an apparatus, for example, a chip or a chip system, in a terminal device. The chip system includes at least one chip, and the chip system may further include another circuit structure and/or discrete component. Optionally, that the communications apparatus is the terminal device is used as an example. As shown in FIG. 12, the communications apparatus 1200 includes a processor 1201, a memory 1202, a transceiver 1203, an antenna 1204, and an input/output apparatus 1205. The processor 1201 is mainly configured to: process a communication protocol and communication data; control the entire wireless communications apparatus; execute a software program; and process data of the software program. For example, the processor 1201 is configured to support the wireless communications apparatus in performing actions described in the foregoing method embodiment. The memory 1202 is mainly configured to store the software program and data. The transceiver 1203 is mainly configured to: perform conversion between a baseband signal and a radio frequency signal and processing of the radio frequency signal. The antenna 1204 is mainly configured to receive and send a radio frequency signal in a form of an electromagnetic wave. The input/output apparatus 1205, such as a touchscreen, a display screen, or a keyboard, is mainly configured to receive data input by a user and output data to the user.

The communications apparatus 1200 is configured to perform functions of the terminal device in the flowchart shown in FIG. 2A and FIG. 2B or in FIG. 5A and FIG. 5B. For details, refer to the foregoing descriptions. Details are not described herein again.

The processor 1201 is configured to: when determining that a data radio bearer DRB corresponding to to-be-sent data is not established and a delay of the to-be-sent data is greater than a threshold, determine a route establishment request message, where the route establishment request message is used to request to establish route configuration information; and the transceiver 1203 is configured to send the route establishment request message to a primary base station.

In a possible design, the transceiver 1203 is further configured to:

receive a TFT configuration request message from a data gateway, where the TFT configuration request message is used to request to: establish a data radio bearer DRB, and configure a TFT corresponding to the DRB;

the processor 1201 establishes the DRB between the apparatus and a secondary base station based on the TFT configuration request message; and if determining that there is a first TFT corresponding to the DRB, and a quality of service class identifier QCI corresponding to the first TFT is the same as a QCI of the data transmitted on the DRB, the processor 1201 adds a data packet filter matching the to-be-sent data to the first TFT; or if determining that there is a first TFT corresponding to the DRB, and a QCI corresponding to the first TFT is different from a QCI of the data transmitted on the DRB, the processor 1201 newly establishes a second TFT, and adds a data packet filter matching the to-be-sent data to the second TFT; or if determining that there is no first TFT corresponding to the DRB, the processor 1201 newly establishes a second TFT, and adds a data packet filter matching the to-be-sent data to the second TFT.

In a possible design, the processor 1201 is specifically configured to:

when a traffic flow template TFT does not include the data packet filter matching the to-be-sent data, determine that the DRB is not established.

Figure 13:
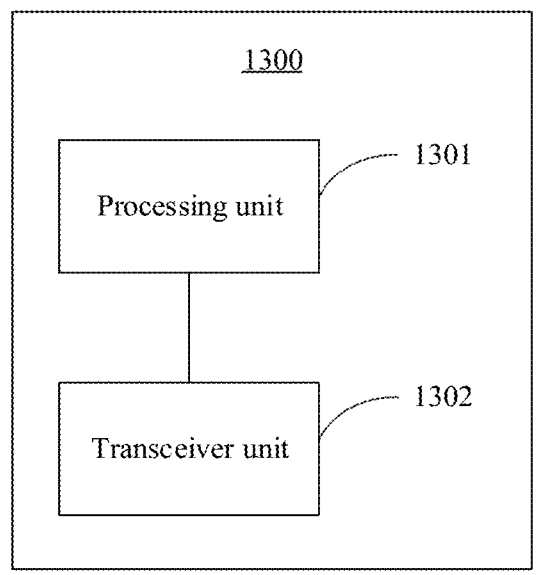
FIG. 13 is a schematic structural diagram of a multi-hop data transmission apparatus according to an embodiment of this application.

FIG. 13 is a schematic structural diagram of a multi-hop data transmission apparatus according to an embodiment of this application.

With reference to FIG. 13, the apparatus 1300 includes:

a processing unit 1301, configured to determine route configuration information, where the route configuration information is used to indicate a first data transmission path between a terminal device and a serving gateway, the first data transmission path includes at least two route base stations, and the at least two route base stations include a secondary base station of the terminal device; and a transceiver unit 1302, configured to send the route configuration information to a primary base station.

In a possible design, before the route configuration information is determined, the transceiver unit 1302 is further configured to: receive a route establishment request message sent by the primary base station, where the route establishment request message is used to request to establish the route configuration information.

In a possible design, the route configuration information includes at least one routing entry; and each of the at least one routing entry includes the following information: a source address, a destination address, an address of a next-hop route base station, a quality of service class identifier QCI corresponding to the data of the terminal device, and a time to live TTL of the routing entry.

Figure 14:
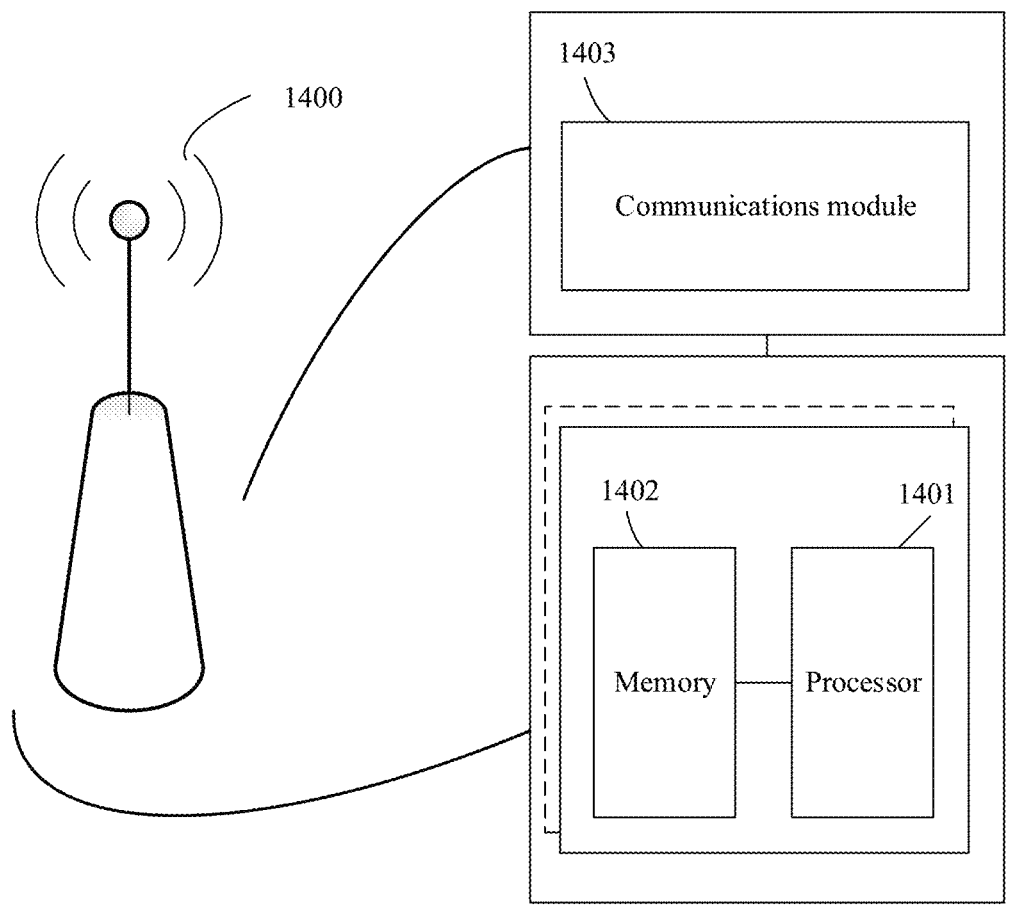
FIG. 14 is a schematic structural diagram of a multi-hop data transmission apparatus according to an embodiment of this application.

FIG. 14 is a schematic structural diagram of a communications apparatus according to an embodiment of this application. The communications apparatus shown in FIG. 14 may be an implementation of a hardware circuit of the communications apparatus shown in FIG. 13. The communications apparatus may be applicable to the flowchart shown in FIG. 2A and FIG. 2B or in FIG. 5A and FIG. 5B, and performs functions of the network management system in the foregoing method embodiment. For ease of description, FIG. 14 shows only main components of the communications apparatus. As shown in FIG. 14, the communications apparatus 1400 includes a processor 1401, a memory 1402, and a communications module 1403. The processor 1401 is mainly configured to: process a communication protocol and communication data; control the entire wireless communications apparatus; execute a software program; and process data of the software program. For example, the processor 1401 is configured to support the wireless communications apparatus in performing actions described in the foregoing method embodiment. The memory 1402 is mainly configured to store the software program and data.

The processor 1401 is configured to determine route configuration information, where the route configuration information is used to indicate a first data transmission path between a terminal device and a serving gateway, the first data transmission path includes at least two route base stations, and the at least two route base stations include a secondary base station of the terminal device; and the communications module 1403 is configured to send the route configuration information to a primary base station.

In a possible design, before the route configuration information is determined, the communications module 1403 is further configured to: receive a route establishment request message sent by the primary base station, where the route establishment request message is used to request to establish the route configuration information.

In a possible design, the route configuration information includes at least one routing entry; and each of the at least one routing entry includes the following information: a source address, a destination address, an address of a next-hop route base station, a quality of service class identifier QCI corresponding to the data of the terminal device, and a time to live TTL of the routing entry.

Figure 15:
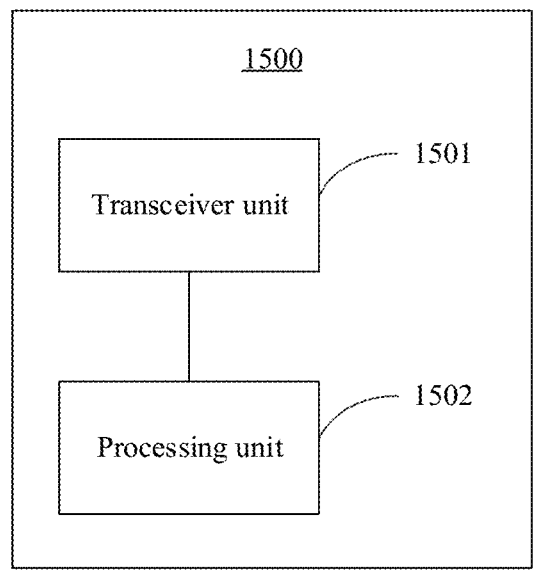
FIG. 15 is a schematic structural diagram of a multi-hop data transmission apparatus according to an embodiment of this application.

FIG. 15 is a schematic structural diagram of a multi-hop data transmission apparatus according to an embodiment of this application.

With reference to FIG. 15, the apparatus 1500 includes:

a transceiver unit 1501, configured to obtain route configuration information, where the route configuration information is used to indicate a first data transmission path between a terminal device and a serving gateway, the first data transmission path includes at least two route base stations, and the at least two route base stations include the secondary base station; and a processing unit 1502, configured to: establish a data radio bearer DRB between the apparatus and the terminal device, and establish a first relationship, where the first relationship is a mapping relationship between a network address of an edge base station and a DRB identifier of the DRB, and the edge base station is a route base station that establishes an S1 bearer with the serving gateway and that is in the at least two route base stations, where the transceiver unit 1501 is configured to transmit data for the terminal device based on the route configuration information and the first relationship or based on the DRB identifier.

According to the foregoing apparatus, because the first data transmission path indicated by the route configuration information includes the at least two route base stations, the secondary base station may perform multi-hop data transmission for the terminal device based on the route configuration information.

In a possible design, the transceiver unit 1501 is further configured to:

receive an uplink data packet from the terminal device, where the uplink data packet includes the DRB identifier; and the transceiver unit 1501 is specifically configured to:

determine, in the first relationship, the network address of the edge base station based on the DRB identifier, and add a network address header to the uplink data packet, where a destination address of the network address header is the network address of the edge base station; and send the uplink data packet to which the network address header is added to a next-hop route base station indicated by the route configuration information.

In a possible design, the transceiver unit 1501 is further configured to:

receive a downlink data packet of the terminal device, where the downlink data packet includes the DRB identifier; and the transceiver unit 1501 is specifically configured to:

send the downlink data packet to the terminal device on the DRB corresponding to the DRB identifier.

In a possible design, the transceiver unit 1501 is further configured to:

receive channel quality information from the terminal device, where the channel quality information indicates a channel quality value between the apparatus and the terminal device; and when the channel quality value indicated by the channel quality information is less than a preset channel quality value, send a route change request message to a primary base station, where the route change request message is used to request to update the route configuration information.

Figure 16:
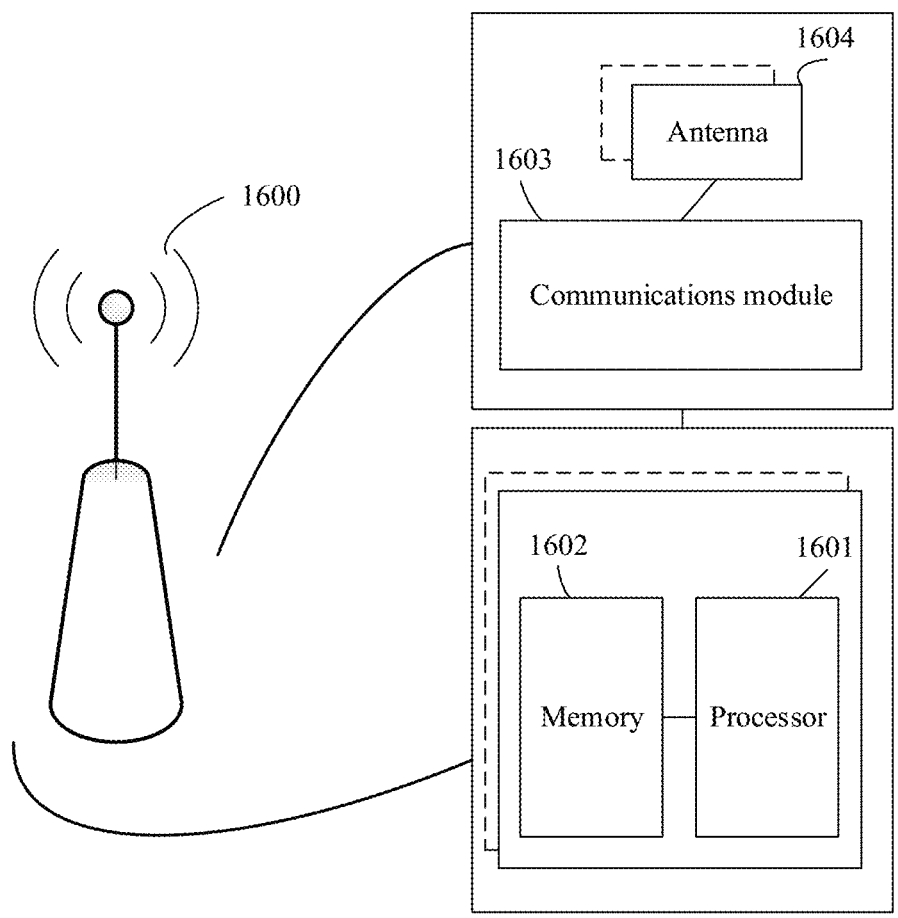
FIG. 16 is a schematic structural diagram of a multi-hop data transmission apparatus according to an embodiment of this application.

FIG. 16 is a schematic structural diagram of a communications apparatus according to an embodiment of this application. The communications apparatus shown in FIG. 16 may be an implementation of a hardware circuit of the communications apparatus shown in FIG. 15. The communications apparatus may be applicable to the flowchart shown in FIG. 2A and FIG. 2B or in FIG. 5A and FIG. 5B, and performs functions of the secondary base station in the foregoing method embodiment. For ease of description, FIG. 16 shows only main components of the communications apparatus. As shown in FIG. 16, the communications apparatus 1600 includes a processor 1601, a memory 1602, a communications module 1603, an antenna 1604, and the like. The processor 1601 is mainly configured to: process a communication protocol and communication data; control the entire wireless communications apparatus; execute a software program; and process data of the software program. For example, the processor 1601 is configured to support the wireless communications apparatus in performing actions described in the foregoing method embodiment. The memory 1602 is mainly configured to store the software program and data.

The communications module 1603 is configured to obtain route configuration information, where the route configuration information is used to indicate a first data transmission path between a terminal device and a serving gateway, the first data transmission path includes at least two route base stations, and the at least two route base stations include a secondary base station.

The processor 1601 is configured to: establish a data radio bearer DRB between the apparatus and the terminal device, and establish a first relationship, where the first relationship is a mapping relationship between a network address of an edge base station and a DRB identifier of the DRB, and the edge base station is a route base station that establishes an S1 bearer with the serving gateway and that is in the at least two route base stations.

The communications module 1603 is configured to transmit data for the terminal device based on the route configuration information and the first relationship or based on the DRB identifier.

According to the foregoing apparatus, because the first data transmission path indicated by the route configuration information includes the at least two route base stations, the secondary base station may perform multi-hop data transmission for the terminal device based on the route configuration information.

In a possible design, the communications module 1603 is further configured to:

receive an uplink data packet from the terminal device, where the uplink data packet includes the DRB identifier; and the communications module 1603 is specifically configured to:

determine, in the first relationship, the network address of the edge base station based on the DRB identifier, and add a network address header to the uplink data packet, where a destination address of the network address header is the network address of the edge base station; and send the uplink data packet to which the network address header is added to a next-hop route base station indicated by the route configuration information.

In a possible design, the communications module 1603 is further configured to:

receive a downlink data packet of the terminal device, where the downlink data packet includes the DRB identifier; and the communications module 1603 is specifically configured to:

send the downlink data packet to the terminal device on the DRB corresponding to the DRB identifier.

In a possible design, the communications module 1603 is further configured to:

receive channel quality information from the terminal device, where the channel quality information indicates a channel quality value between the apparatus and the terminal device; and when the channel quality value indicated by the channel quality information is less than a preset channel quality value, send a route change request message to a primary base station, where the route change request message is used to request to update the route configuration information.

Figure 17:
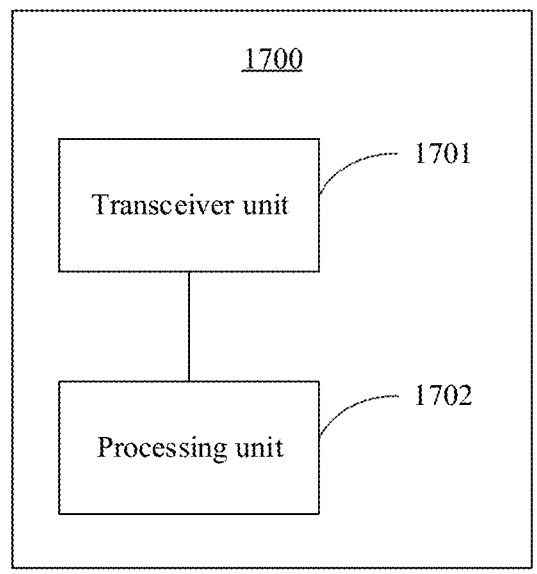
FIG. 17 is a schematic structural diagram of a multi-hop data transmission apparatus according to an embodiment of this application.

FIG. 17 is a schematic structural diagram of a multi-hop data transmission apparatus according to an embodiment of this application.

With reference to FIG. 17, the apparatus 1700 includes:

a transceiver unit 1701, configured to: receive route configuration information from a primary base station, where the route configuration information is used to indicate a first data transmission path between a terminal device and a serving gateway, the first data transmission path includes at least two route base stations, the at least two route base stations include a secondary base station of the terminal device, and the edge base station is a device that establishes an S1 bearer with the serving gateway and that is in the at least two route base stations; and receive a data radio bearer DRB identifier from the secondary base station, where the DRB identifier is an identifier of a data radio bearer DRB between the secondary base station and the terminal device; and a processing unit 1702, configured to establish the S1 bearer between the apparatus and the serving gateway, and establish a second relationship, where the second relationship is a mapping relationship between the DRB identifier and an S1 tunnel endpoint identifier TEID of the S1 bearer, where the transceiver unit 1701 is configured to transmit data for the terminal device based on the DRB identifier and the second relationship or based on the S1 TEID, the second relationship, and the route configuration information.

According to the foregoing apparatus, because the first data transmission path indicated by the route configuration information includes the at least two route base stations, the edge base station may perform multi-hop data transmission for the terminal device based on the route configuration information.

In a possible design, the transceiver unit 1701 is further configured to:

receive an uplink data packet from the terminal device, where the uplink data packet includes the DRB identifier; and the transceiver unit 1701 is specifically configured to:

determine, in the second relationship, the S1 TEID based on the DRB identifier, and replace the DRB identifier in the uplink data packet with the S1 TEID;

add a network address header to the uplink data packet, where a destination address of the network address header is a network address of the serving gateway; and send the uplink data packet to which the network address header is added to the serving gateway on the S1 bearer corresponding to the S1 TEID.

In a possible design, the transceiver unit 1701 is further configured to:

receive a downlink data packet of the terminal device, where the downlink data packet includes the S1 TEID; and the transceiver unit 1701 is further configured to:

determine, in the second relationship, the DRB identifier based on the S1 TEID, and replace the S1 TEID in the downlink data packet with the DRB identifier;

add a network address header to the downlink data packet, where a destination address of the network address header is a network address of the secondary base station; and send the downlink data packet to which the network address header is added to a next-hop route base station indicated by the route configuration information.

Figure 18:
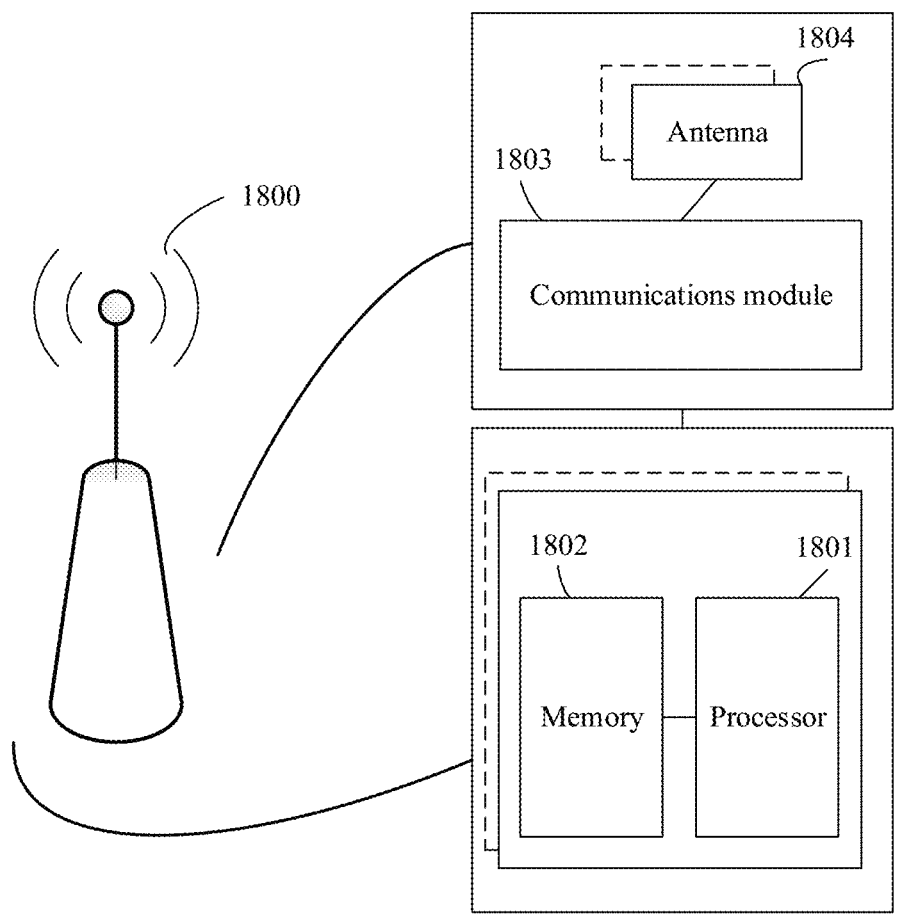
FIG. 18 is a schematic structural diagram of a multi-hop data transmission apparatus according to an embodiment of this application.

FIG. 18 is a schematic structural diagram of a communications apparatus according to an embodiment of this application. The communications apparatus shown in FIG. 18 may be an implementation of a hardware circuit of the communications apparatus shown in FIG. 17. The communications apparatus may be applicable to the flowchart shown in FIG. 2A and FIG. 2B or in FIG. 5A and FIG. 5B, and performs functions of the edge base station in the foregoing method embodiment. For ease of description, FIG. 18 shows only main components of the communications apparatus. As shown in FIG. 18, the communications apparatus 1800 includes a processor 1801, a memory 1802, a communications module 1803, an antenna 1804, and the like. The processor 1801 is mainly configured to: process a communication protocol and communication data; control the entire wireless communications apparatus; execute a software program; and process data of the software program. For example, the processor 1801 is configured to support the wireless communications apparatus in performing actions described in the foregoing method embodiment. The memory 1802 is mainly configured to store the software program and data.

The communications module 1803 is configured to: receive route configuration information from a primary base station, where the route configuration information is used to indicate a first data transmission path between a terminal device and a serving gateway, the first data transmission path includes at least two route base stations, the at least two route base stations include a secondary base station of the terminal device, and the edge base station is a device that establishes an S1 bearer with the serving gateway and that is in the at least two route base stations; and receive a data radio bearer DRB identifier from the secondary base station, where the DRB identifier is an identifier of a data radio bearer DRB between the secondary base station and the terminal device.

The processor 1801 is configured to establish the S1 bearer between the apparatus and the serving gateway, and establish a second relationship, where the second relationship is a mapping relationship between the DRB identifier and an S1 tunnel endpoint identifier TEID of the S1 bearer.

The communications module 1803 is configured to transmit data for the terminal device based on the DRB identifier and the second relationship or based on the S1 TEID, the second relationship, and the route configuration information.

According to the foregoing apparatus, because the first data transmission path indicated by the route configuration information includes the at least two route base stations, the edge base station may perform multi-hop data transmission for the terminal device based on the route configuration information.

In a possible design, the communications module 1803 is further configured to:

receive an uplink data packet from the terminal device, where the uplink data packet includes the DRB identifier; and the communications module 1803 is specifically configured to:

determine, in the second relationship, the S1 TEID based on the DRB identifier, and replace the DRB identifier in the uplink data packet with the S1 TEID;

add a network address header to the uplink data packet, where a destination address of the network address header is a network address of the serving gateway; and send the uplink data packet to which the network address header is added to the serving gateway on the S1 bearer corresponding to the S1 TEID.

In a possible design, the communications module 1803 is further configured to:

receive a downlink data packet of the terminal device, where the downlink data packet includes the S1 TEID; and the communications module 1803 is further configured to:

determine, in the second relationship, the DRB identifier based on the S1 TEID, and replace the S1 TEID in the downlink data packet with the DRB identifier; add a network address header to the downlink data packet, where a destination address of the network address header is a network address of the secondary base station; and send the downlink data packet to which the network address header is added to a next-hop route base station indicated by the route configuration information.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

Clearly, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A multi-hop data transmission method, comprising:
    obtaining, by a primary base station, route configuration information, wherein the route configuration information indicates a first data transmission path between a terminal device and a serving gateway, the first data transmission path comprises at least two route base stations, and the at least two route base stations comprise a secondary base station for the terminal device; and
    sending, by the primary base station, the route configuration information to the at least two route base stations,
    wherein the sending, by the primary base station, the route configuration information to the at least two route base stations comprises:
    sequentially sending, by the primary base station, the route configuration information to the at least two route base stations in a direction opposite to a direction in which data passes through the at least two route base stations in the first data transmission path.

2. The method according to claim 1, wherein the obtaining, by the primary base station, the route configuration information comprises:
    receiving, by the primary base station, the route configuration information from a network management system.

3. The method according to claim 2, wherein before the receiving, by the primary base station, the route configuration information from the network management system, the method further comprises:
    receiving, by the primary base station, a route establishment request message from the terminal device or a data gateway, wherein the route establishment request message is used to request to establish the route configuration information; and
    sending, by the primary base station, the route establishment request message to the network management system.

4. The method according to claim 1, wherein the method further comprises:
    receiving, by the primary base station, a route change request message from the secondary base station, wherein the route change request message is used to request to update the route configuration information; and
    obtaining, by the primary base station, updated route configuration information.

5. The method according to claim 1, wherein the method further comprises:
    sending, by the primary base station, a topology change message to a network management system, wherein the topology change message indicates that a topology of the first data transmission path changes; and
    obtaining, by the primary base station, the updated route configuration information.

6. The method according to claim 4, wherein the updated route configuration information indicates a second data transmission path between the terminal device and the serving gateway, and the second data transmission path comprises at least two route base stations; and
    wherein the method further comprises:
        when determining that the secondary base station for the terminal device changes to a first base station, indicating, by the primary base station, the terminal device to establish a data radio bearer (DRB) with the first base station, wherein the first base station is a route base station in the second data transmission path.

7. The method according to claim 4, wherein the updated route configuration information indicates a second data transmission path between the terminal device and the serving gateway, and the second data transmission path comprises at least two route base stations; and wherein the method further comprises:
when determining that an edge base station changes to a second base station, indicating, by the primary base station, the second base station to establish an S1 bearer with the serving gateway, wherein the second base station is a route base station in the second data transmission path, and the edge base station is a route base station that establishes the S1 bearer with the serving gateway and that is in the at least two route base stations comprised in the first data transmission path.

8. An apparatus for a primary base station, comprising at least one processor and a memory coupled to the at least one processor and storing programming instructions for execution by the at least one processor, wherein the programming instructions instruct the primary base station to perform operations comprising:
obtaining route configuration information, wherein the route configuration information indicates a first data transmission path between a terminal device and a serving gateway, the first data transmission path comprises at least two route base stations, and the at least two route base stations comprise a secondary base station for the terminal device; and
sending the route configuration information to the at least two route base stations,
wherein the programming instructions instructing the primary base station to send the route configuration information to the at least two route base stations includes programming instructions that instruct the apparatus to:
sequentially send the route configuration information to the at least two route base stations in a direction opposite to a direction in which data passes through the at least two route base stations in the first data transmission path.

9. The apparatus according to claim 8, wherein the programming instructions instruct the primary base station to obtain route configuration information include programming instructions that instruct the primary base station to:
receive the route configuration information from a network management system.

10. The apparatus according to claim 9, wherein the programming instructions further instruct the primary base station to perform operations comprising:
before the receiving the route configuration information from a network management system, receiving a route establishment request message from the terminal device or a data gateway, wherein the route establishment request message is used to request to establish the route configuration information; and
sending the route establishment request message to the network management system.

11. The apparatus according to claim 8, wherein the programming instructions further instruct the primary base station to perform operations comprising:
receiving a route change request message from the secondary base station, wherein the route change request message is used to request to update the route configuration information; and
obtaining updated route configuration information.

12. The apparatus according to claim 8, wherein the programming instructions further instruct the primary base station to perform operations comprising:
sending a topology change message to a network management system, wherein the topology change message indicates that a topology of the first data transmission path changes; and
obtaining the updated route configuration information.

13. The apparatus according to claim 11, wherein the updated route configuration information indicates a second data transmission path between the terminal device and the serving gateway, and the second data transmission path comprises at least two route base stations; and
wherein the programming instructions further instruct the primary base station to perform operations comprising:
when determining that the secondary base station for the terminal device changes to a first base station, indicating the terminal device to establish a data radio bearer (DRB) with the first base station, wherein the first base station is a route base station in the second data transmission path.

14. The apparatus according to claim 11, wherein the updated route configuration information indicates a second data transmission path between the terminal device and the serving gateway, and the second data transmission path comprises at least two route base stations; and
wherein the programming instructions further instruct the primary base station to perform operations comprising:
when determining that an edge base station changes to a second base station, indicating the second base station to establish an S1 bearer with the serving gateway, wherein the second base station is a route base station in the second data transmission path, and the edge base station is a route base station that establishes the S1 bearer with the serving gateway and that is in the at least two route base stations comprised in the first data transmission path.

15. The method according to claim 1, wherein each route base station is a radio access device.

16. The apparatus according to claim 8, wherein each route base station is a radio access device.

* * * * *